US007065210B1

(12) United States Patent
Tsujii et al.

(10) Patent No.: US 7,065,210 B1
(45) Date of Patent: Jun. 20, 2006

(54) SECRET KEY GENERATION METHOD, ENCRYPTION METHOD, CRYPTOGRAPHIC COMMUNICATIONS METHOD, COMMON KEY GENERATOR, CRYPTOGRAPHIC COMMUNICATIONS SYSTEM, AND RECORDING MEDIA

(75) Inventors: Shigeo Tsujii, Shibuya-ku (JP); Masao Kasahara, Minoo (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/489,696

(22) Filed: Jan. 24, 2000

(30) Foreign Application Priority Data

Jan. 25, 1999 (JP) ................................. 11-016257
Mar. 5, 1999 (JP) ................................. 11-059049

(51) Int. Cl.
*H04L 9/00* (2006.01)
(52) U.S. Cl. ............................. 380/44; 726/3; 380/259
(58) Field of Classification Search ............ 380/43–47, 380/21, 279, 23, 25, 30, 259–260; 713/171, 713/200–202; 726/3–4; 705/50
See application file for complete search history.

(56) References Cited

U.S. PATENT DOCUMENTS

| 4,736,423 | A | * | 4/1988 | Matyas ........................ 713/185 |
| 5,016,276 | A | | 5/1991 | Matumoto et al. |
| 5,220,606 | A | * | 6/1993 | Greenberg .................... 380/43 |
| 5,241,599 | A | * | 8/1993 | Bellovin et al. ............. 713/171 |
| 5,539,827 | A | * | 7/1996 | Liu ............................... 380/37 |
| 5,588,061 | A | * | 12/1996 | Ganesan et al. .............. 380/30 |
| 5,764,772 | A | * | 6/1998 | Kaufman et al. ............. 380/30 |
| 5,987,128 | A | * | 11/1999 | Baba .......................... 380/279 |
| 5,987,129 | A | * | 11/1999 | Baba .......................... 380/279 |

FOREIGN PATENT DOCUMENTS

JP 04-245287 9/1992

OTHER PUBLICATIONS

A. Fujikawa et al., "Computationally Secure ID-NIKS", Technical Report of IEICE, Jul. 1996.
S. Tsujii et al., "A New Concept of Key Sharing Systems", The 1999 Symposium on Cryptography and Information Security, Jan. 1999.
M. Kasahara et al., "Common-key Sharing Scheme Based on Double Exponential Function", Technical Report of IEICE May 1999.

(Continued)

*Primary Examiner*—Kim Vu
*Assistant Examiner*—T. B. Truong
(74) *Attorney, Agent, or Firm*—Hogan & Hartson,L.L.P.

(57) ABSTRACT

A cryptographic communications method based on ID-NIKS, wherewith mathematical structures are minimized, the collusion problem can be circumvented, and building the cryptosystem is simplified. A plurality of centers are provided for distributing a plurality of secret keys to a plurality of entities, respectively. Each secret key is unique to each entity. Information specifying the entities (entity ID information) is divided into a plurality of pieces or segments. All secret keys produced for the pieces of entity ID information are distributed to the entities. Using a component contained in the secret key peculiar to itself, each entity generates a common key to be shared by another entity. This component corresponds to a piece of ID information of another entity.

15 Claims, 5 Drawing Sheets

OTHER PUBLICATIONS

Rolf Blom, "Non-Public Key Distribution", Advances in cryptology: proceedings of CRYPTO 82 / edited by David Chaum, Ronald L. Rivest, and Alan T. Sherman / New York: Plenum Press, pp. 231-236.

Adi Shamir, "Identity-Based Cryptosystems and Signature Schemes", Advances in Cryptology: proceedings of CRYPTO 84 / edited by G.R. Blakley and David Caum / Berlin; Tokyo: Springer-Verlag, pp. 47-53.

* cited by examiner ( t=0,1,2,···,T )

SECRET KEY GENERATION METHOD, ENCRYPTION METHOD, CRYPTOGRAPHIC COMMUNICATIONS METHOD, COMMON KEY GENERATOR, CRYPTOGRAPHIC COMMUNICATIONS SYSTEM, AND RECORDING MEDIA

BACKGROUND OF THE INVENTION

1. Field of the Invention

This invention relates to a secret key generation method for generating secret keys peculiar to entities, to an encryption method for encrypting information so that it will be unintelligible to any but an authorized party, and to a cryptographic communications method which performs communications with ciphertext.

2. Description of the Related Art

In today's world, characterized by sophisticated information utilization, important business documents and image information are transmitted and processed in the form of electronic information over an infrastructure of computer networks. By its very nature, electronic information can be easily copied, making it extremely difficult to distinguish between the copy and the original, and information security has become a very serious problem. The realization of computer networks which support "shared computer resources," "multi-access," and "broad-area implementation" is particularly indispensable to the establishment of a high-level information society. However, that very realization involves aspects which are inconsistent with the security of information exchanged between authorized parties. An effective technique for eliminating that inconsistency is encryption technology, which up until now, in the course of human history, has been primarily used in the fields of military operations and foreign diplomacy.

Cryptography is the process of exchanging information so that its meaning cannot be understood by anyone other than the authorized parties. In cryptographic operations, the conversion of the original text (plaintext) that anyone can understand to text (ciphertext) the meaning of which cannot be understood by a third party is called encryption, and the restoration of the ciphertext to plaintext is called decryption. The overall system wherein this encryption and decryption are performed is called a cryptosystem. In the processes of encryption and decryption, respectively, secret information called encryption keys and decryption keys are employed. A secret decryption key is necessary at the time of decryption, wherefore only a party knowledgeable of that decryption key can decrypt the ciphertext. Accordingly, the confidentiality of the information is maintained by the encryption.

The encryption key and decryption key may be the same or they may be different. A cryptosystem wherein both keys are the same is called a common key cryptosystem, and the DES (Data Encryption Standards) adopted by the Bureau of Standards of the U.S. Department of Commerce is a typical example thereof. Conventional examples of such common key encryption schemes can be divided into the following three types.

(1) Type 1

Methods wherewith all common keys to be shared with possible parties in cryptographic communications are held in secret.

(2) Type 2

Methods wherewith keys are mutually shared by a preparatory communication each time cryptographic communications are conducted (including Diffie-Hellman-based key sharing scheme, key distribution scheme based on public key schemes, etc.).

(3) Type 3

Methods wherewith disclosed identification information (ID information)) that specifies an individual, such as user (entity) name and address, etc., is used, and both the sending entity and receiving entity independently generate the same common key without preparatory communications (including KPS (key predistribution systems), ID-NIKS (ID-based non-interactive key sharing schemes), etc.).

Such conventional methods as seen in these three types of schemes are subject to the problems described below. With method 1, since all of the common keys are stored, this scheme is unsuitable for a network society wherein an unspecified large number of users become entities and conduct cryptographic communications. With method 2, there is a problem in that preparatory communications are required for key sharing.

Method 3 is a convenient method because it requires no preparatory communications, and a common key with any opposite party can be generated using the disclosed ID information of the opposite party together with characteristic secret parameters distributed beforehand from a center. Nevertheless, this scheme is subject to the following two problems. Firstly, the center must become a "big brother" (creating a key escrow system wherein the center holds the secrets of all of the entities). Secondly, there is a possibility that some number of entities could collude to compute the center secrets. In the face of this collusion problem, many innovative techniques have been devised to circumvent the problem by way of computation volume, but a complete solution is very difficult.

The difficulties of resolving this collusion problem arise from the fact that the secret parameters based on the ID information form dual structures comprising center secrets and personal secrets. With method 3, a cryptosystem is configured using the disclosed parameters of the center, the disclosed ID information of the individual entities, and the two types of secret parameters for the center and entities. Not only so, but it is necessary also to configure such that center secrets will not be revealed even if the entities compare the personal secrets distributed to each. Accordingly, there are many problems that must be resolved before this cryptosystem can be actually realized.

SUMMARY OF THE INVENTION

It is an object of the present invention to provide a secret key generation method, encryption method, and cryptographic communications method based on an ID-NIKS, wherewith specifying information (ID information) is divided into a plurality of portions, and all secret keys based on the divided specifying information are distributed to entities from each of a plurality of centers, whereby it is possible to minimize the mathematical structures, circumvent the collusion problem, and facilitate the construction of the cryptosystem.

Another object of the present invention is to provide a secret key generation method, encryption method, and cryptographic communications method that are more highly resistant to random number substitution attack.

According to a first aspect of the present invention, there is provided a secret key generation method for generating secret keys peculiar to entities that are to be sent from a center to the entities, characterized in that the secret keys peculiar to the entities are generated using divided specifying information resulting from the division of information specifying the entities.

According to a second aspect of the present invention, there is provided an encryption method wherein secret keys peculiar to entities are sent to the entities from the center respectively, and an entity encrypts plaintext to ciphertext using a secret key peculiar to that entity sent from the center, characterized in that the secret keys peculiar to the entities are generated using divided specifying information resulting from the division of information specifying the entities, and plaintext is encrypted to ciphertext at one entity that is a ciphertext sender using a common key generated from a component contained in its own secret key, the component corresponding to the divided specifying information of another entity that is a destination of the ciphertext.

According to a third aspect of the present invention, there is provided a cryptographic communications method for communicating information between entities, wherein one entity encrypts plaintext to ciphertext using a first common key derived from a first secret key peculiar to that entity sent from a center and sends the ciphertext to another entity (recipient), and the recipient decrypts the ciphertext to the plaintext using a second common key identical to the first common key, the second common key being derived from a second secret key peculiar to the recipient sent from the center, characterized in that a plurality of the centers are deployed, each of the centers generates secret keys peculiar to the entities using divided specifying information resulting from the division of information specifying the entities, and each of the entities generates the common key using a component, contained in its own secret key, corresponding to the divided specifying information of an opposite entity.

The reason why the various cryptosystems based on entity specifying information proposed for the purpose of resolving the collusion problem have been unsuccessful lies in excessively seeking mathematical structures to provide innovative techniques for preventing center secrets from being deduced from entity collusion information. When the mathematical structures are too complex, the method of demonstrating safety becomes very difficult. In the present invention, therefore, the mathematical structures are held to a bare minimum by dividing entity specifying information into a plurality of portions and distributing all the secret keys for each of the divided specifying information to the entities.

In the present invention, a plurality of centers are deployed, and each center generates a secret key corresponding to one unit (or piece) of divided specifying information for one entity. Accordingly, no single center holds all of the entity secrets and hence no center becomes a "big brother." Also, because the mathematical structures are held down to a minimum, circumvention of the collusion problem is easily realized and the cryptosystem is also simple to implement. Furthermore, the secret keys peculiar to one entity for that entity to generate a common key have been sent from the centers and are stored from the start in table form, wherefore the time required for common key generation can be significantly shortened.

According to a fourth aspect of the present invention, there is provided a secret key generation method for generating secret keys specific to entities using divided specifying information resulting from the division of information specifying the entities into a plurality of blocks, characterized in that the secret key for a first block of divided specifying information has a multi-layer structure and each of the secret keys for the remaining blocks of divided specifying information has a single-layer structure.

According to a fifth aspect of the present invention, there is provided an encryption method wherein secret keys peculiar to entities are generated using divided specifying information resulting from the division of information specifying the entities into a plurality of blocks, plaintext is encrypted to ciphertext using a common key generated using a component, contained in the secret key, corresponding to the divided specifying information for an opposite entity to which the ciphertext is to be sent, characterized in that the secret key for a first block of divided specifying information has a multi-layer structure, and each of the secret keys for the remaining blocks of divided specifying information has a single-layer structure.

According to a sixth aspect of the present invention, there is provided a cryptographic communications method for communicating information between entities, wherein a plurality of centers are deployed, each of which generates secret keys peculiar to the entities using divided specifying information resulting from the division of information specifying the entities into a plurality of blocks, one entity generates a first common key using a first component contained in secret keys peculiar to that entity sent from the centers and corresponding to the divided specifying information of another entity (recipient), encrypts plaintext to ciphertext using the first common key, and sends the ciphertext to the recipient, the recipient generates a second common key identical to the first common key, using a second component contained in secret keys peculiar to the recipient sent from the centers and corresponding to the divided specifying information of the ciphertext sender, and decrypts the ciphertext to the original plaintext using the second common key, the secret key for a first block of divided specifying information has a multi-layer structure, and the secret keys for the remaining blocks of divided specifying information have a single-layer structure.

The present invention is configured in such a manner that the common key can only be derived after the computation for all blocks is complete, and a divided block of information specifying a specific entity cannot be attacked independently, whereupon random number substitution attack can be circumvented.

The term "recording medium" or "computer usable (or readable) medium" in this specification includes any physical object in which a program to be executed by CPU or the like is stored. For example, the "recording medium" includes a floppy disc, CD-ROM, hard disk drive, ROM, RAM, optical recording medium such as DVD, photomagnetic recording medium such as MO, magnetic recording medium such as magnetic tape, and semiconductor memory such as IC card and miniature card. A data signal embodied in a carrier wave may be the computer readable medium.

DESCRIPTION OF THE PREFERRED EMBODIMENTS

Embodiments of the present invention are now described.

Figure 1:
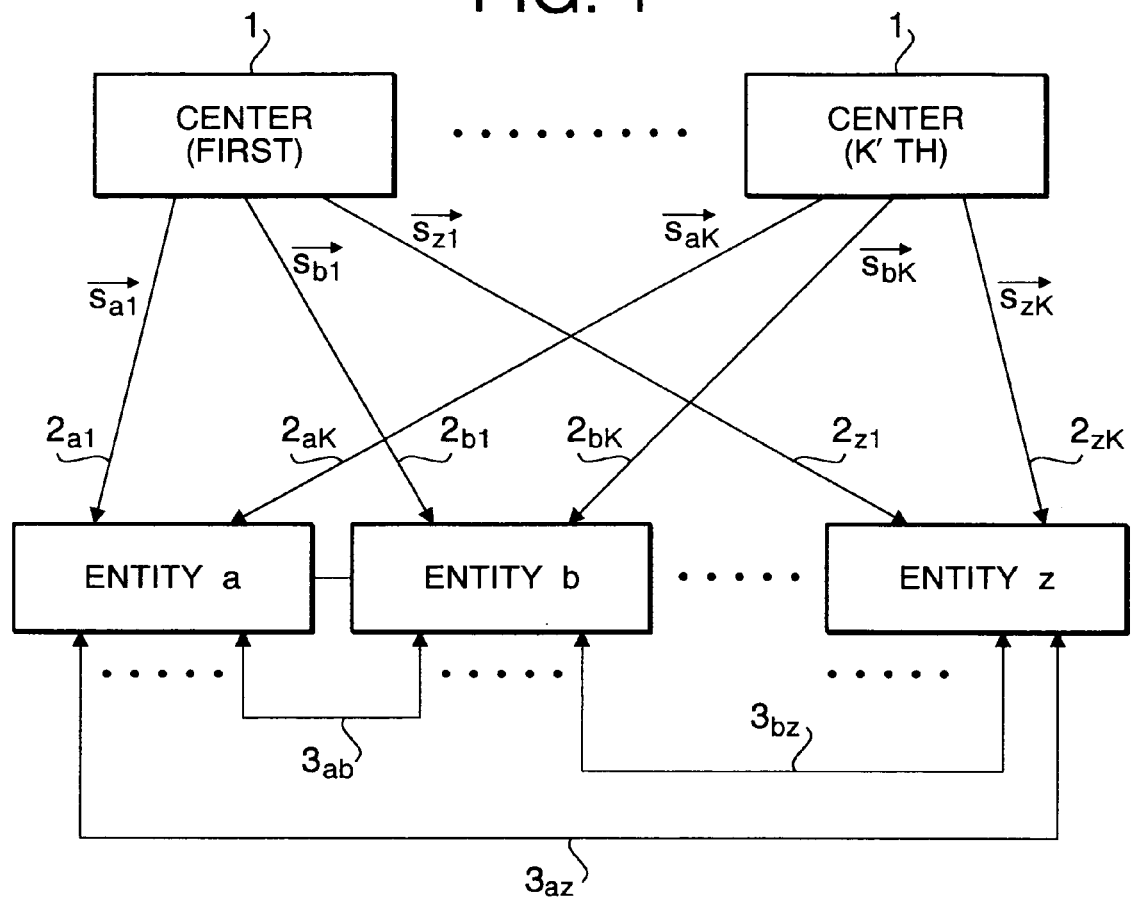
FIG. 1 illustrates a model diagram representing the configuration of a cryptographic communications system of the present invention.

FIG. 1 is a model diagram representing the configuration of an cryptographic communications system of the present invention. A plurality of centers 1 (K in number) which can be trusted to maintain information confidentiality are established. These centers 1 may be public institutions in a society, for example. The deployment of the plurality of centers 1 is the point of difference with the conventional third method.

These centers 1 are connected to a plurality of entities a, b, . . . , z that are the users employing this cryptosystem by secret channels (communication paths) $2_{a1}$, $2_{aK}$, $2_{b1}$, . . . , $2_{bK}$, . . . $2_{z1}$, . . . , $2_{zK}$. Secret information is sent from the centers 1 via these secret communication paths to the entities a, b, . . . , z. Communication paths $3ab$, $3az$, $3bz$, etc., are also provided between pairs of entities. Ciphertext obtained by encrypting communications information is sent back and forth between entities via these communication paths $3ab$, $3az$, $3bz$, etc.

1st Embodiment

A first embodiment that is a basic scheme of the present invention is described first.

Preparatory Processing at Centers 1:

The centers 1 prepare public keys and secret keys as follows and disclose the public keys.

| Public key | P | Large prime number |
|---|---|---|
| | L | Size of ID vector (L = KM) |
| | K | Number of ID vector division blocks |
| | M | Size of divided ID vector |
| Secret key | g | GF (P) primitive element |
| | $H_j$ | Symmetrical $2^M \times 2^M$ matrix formed of random numbers (j = 1, 2, . . . , K) |
| | $\alpha_{ij}$ | Personal secret random number of entity i (where $\alpha_{i1}\alpha_{i2} \ldots \alpha_{iK} \equiv 1$ (mod P – 1)) |

Figure 2:
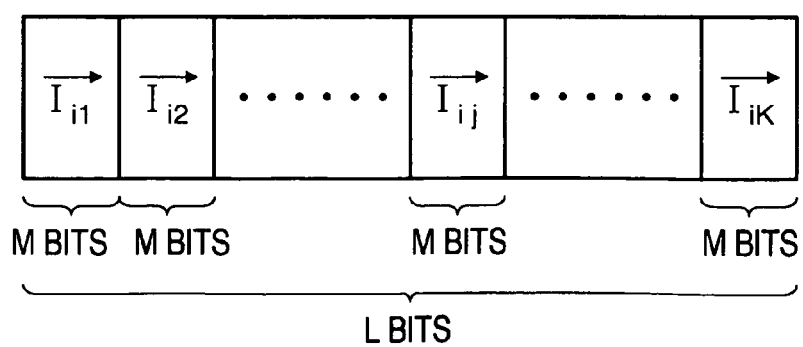
FIG. 2 illustrates a model diagram representing an example of entity ID vector division.

ID vectors that are specifying information indicating the names and addresses of entities are made L-dimension binary vectors, and each of the ID vectors is divided into K blocks (each has a block size M) as diagrammed in FIG. 2. The ID vector for entity i (i.e. vector $I_i$), for example, is divided as indicated in formula 1 below. The vectors $I_{ij}$ (j=1, 2, . . . , K), that are divided specifying information, are called ID division vectors.

$$\vec{I_i} = [\vec{I_{i1}} | \vec{I_{i2}} | \ldots | \vec{I_{ij}}] \quad (1)$$

Entity Registration Processing:

When each of the centers 1 is requested by an entity i for registration, K secret vectors $s_{ij}$ (j=1, 2, . . . K) corresponding, respectively, to a prepared key and K ID division vectors for entity i are found according to formulas 2-1, 2-2, . . . , 2-K, as represented below, the vectors $s_{ij}$ so found are sent to entity i in secret, and registration is complete.

$$\vec{s_{i_1}} \equiv g^{\alpha_{i1} H_1[\vec{I_{i1}}]} \pmod{P} \quad (2\text{-}1)$$

$$\vec{s_{i_2}} \equiv \alpha_{i2} H_2[\vec{I_{i2}}] \pmod{P-1} \quad (2\text{-}2)$$

$$\vec{s_{iK}} \equiv \alpha_{iK} H_K[\vec{I_{iK}}] \pmod{P-1} \quad (2\text{-}K)$$

However, when g is a scalar, and A and B are matrixes, the representation $B=g^A$ indicates that power multiplication on g is performed for each component ($\mu$, $\nu$) of A. In other words, the result is as given in formula 3 below. The representation $H_j$ [vector $I_{ij}$] indicates that one row corresponding to the vector $I_{ij}$ is extracted from the symmetrical matrix $H_j$, and the [·] operation is also defined for reference.

$$B_{\mu\nu} = g^{A_{\mu\nu}} \quad (3)$$

Processing for Generating Common Keys Between Entities:

Entity i selects from its own secret key vectors $s_{i1}$ a vector $s_{i1}$ [vector $I_{m1}$] of the component corresponding to vector $I_{m1}$ that is the ID division vector of entity m, and also selects from among the secret key vectors $s_{ij}$ for each of the blocks j (j=2, . . . , K) the vector $s_{ij}$ [vector $I_{mj}$] of the component corresponding to the vector $I_{mj}$. Then, entity i sequentially power-multiplies all of the vectors $s_{ij}$ [vector $I_{mj}$] (j=2, . . . , K) except for the vector $s_{i1}$ [vector $I_{m1}$], with modulo P and the vector $s_{i1}$ [vector $I_{m1}$] as the base, thereby deriving the common key $K_{im}$. The computation formula for finding this $K_{im}$ specifically becomes formula 4 below. This $K_{im}$ coincides with the common key $K_{mi}$ derived at the entity m end.

$$K_{im} \equiv \vec{s_{i1}}[\vec{I_{m1}}]^{\vec{s_{i2}}[\vec{I_{m2}}] \cdots \vec{s_{iK}}[\vec{I_{mK}}]} \quad (4)$$

$$\equiv g^{\alpha_{i1} \cdots \alpha_{iK} \cdot H_1[\vec{I_{i1}}][\vec{I_{m1}}] \cdots H_K[\vec{I_{iK}}][\vec{I_{mK}}]}$$

$$\equiv g^{H_1[\vec{I_{i1}}][\vec{I_{m1}}] \cdots H_K[\vec{I_{iK}}][\vec{I_{nK}}]} \pmod{P}$$

Figure 3:
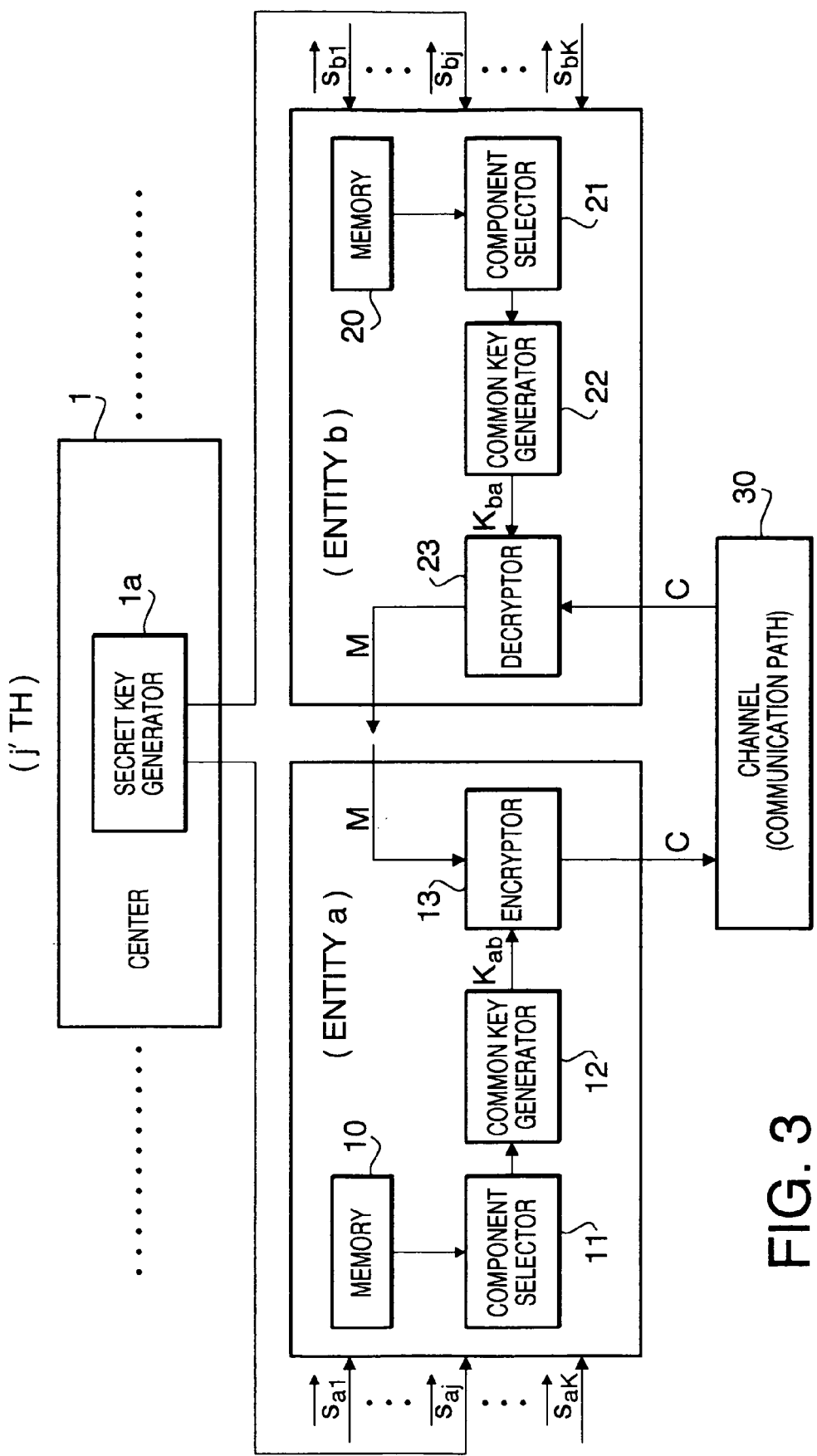
FIG. 3 illustrates a model diagram showing how information is communicated between two entities.

Next, the communication of information between entities in the cryptosystem described above is described. FIG. 3 illustrates information communicated between two entities a and b. In the example diagrammed in FIG. 3, entity a encrypts a plaintext (message) M to a ciphertext C which it sends to entity b, and entity b decrypts that ciphertext C back to the original plaintext (message) M.

A secret key generator 1a is provided at the j'th center 1 (where j=1, 2, . . . , K) for deriving the vectors $s_{aj}$ and $s_{bj}$ (secret keys) peculiar to the entities a and b, respectively, following formula 2-j given earlier. Then, when a request for registration is tendered from the entities a and b, the secret key vectors $s_{aj}$ and $s_{bj}$ for those entities a and b are sent to the entities a and b.

Entity a is provided with a memory 10 for storing, in tabular form, the characteristic secret key vectors $s_{a1}$, . . . , $s_{aj}$, . . . , $s_{aK}$ sent from the K centers 1, a component selector 11 for selecting from among those secret key vectors the vector $s_{a1}$ [vector $I_{b1}$], . . . , vector $s_{aj}$ [vector $I_{bj}$] . . . , vector $s_{aK}$ [vector $I_{bK}$] for the components corresponding to entity b, a common key generator 12 for generating the common key $K_{ab}$ with entity b sought by entity a using those components selected, and an encryptor 13 for encrypting the plaintext (message) M to the ciphertext C using that common key $K_{ab}$ and outputting it over the communication path 30.

Entity b, meanwhile, is provided with a memory 20 for storing, in tabular form, the characteristic secret key vectors $s_{b1}, \ldots, s_{bj}, \ldots, s_{bK}$ sent from the centers 1, a component selector 21 for selecting from among those secret key vectors the vector $s_{b1}$ [vector $I_{a1}$], ..., vector $s_{bj}$ [vector $I_{aj}$], ..., vector $s_{bK}$ [vector $I_{aK}$] for the components corresponding to entity a, a common key generator 22 for generating the common key $K_{ba}$ with entity a sought for by entity b using those components selected, and a decryptor 23 for decrypting the ciphertext C input from the communication path 30 to the plaintext (message) M using that common key $K_{ba}$ and outputting it.

When information is to be sent from entity a to entity b, first, the secret key vectors $s_{a1}, s_{a2}, \ldots, s_{aK}$ pre-stored in the memory 10 after being derived according to the formulas 2-1, 2-2, ..., 2-K at the centers 1 are read out to the component selector 11. Then, the component selector 11 selects the vector $s_{a1}$ [vector $I_{b1}$], vector $s_{a2}$ [vector $I_{b2}$], ..., and vector $s_{aK}$ [vector $I_{bK}$] that are the components corresponding to entity b, and sends them to the common key generator 12. The common key generator 12 uses these components to derive the common key $K_{ab}$ according to formula 4, and sends that common key $K_{ab}$ to the encryptor 13. With the encryptor 13, this common key $K_{ab}$ is used to encrypt the plaintext (message) M to the ciphertext C and the ciphertext C is sent via the communication path 30.

The ciphertext C sent over the communication path 30 is input to the decryptor 23 of entity b. The secret key vectors $s_{b1}, s_{b2}, \ldots, s_{bK}$ derived according to formulas 2-1, 2-2, ..., 2-K at the centers 1 and prestored in the memory 20 are read out to the component selector 21. Then, the component selector 21 selects the vector $s_{b1}$ [vector $I_{a1}$], vector $s_{b2}$ [vector $I_{a2}$], ..., vector $s_{bK}$ [vector $I_{aK}$] that are components corresponding to entity a, and sends them to the common key generator 22. The common key generator 22 uses these components to derive the common key $K_{ba}$ according to formula 4 and sends this common key $K_{ba}$ to the decryptor 23. The decryptor 23 uses the common key $K_{ba}$ to decrypt the ciphertext C to the plaintext (message) M.

In the scheme of the present invention, the secret key vectors peculiar to the entities are stored beforehand in the memories of the entities so that a shorter time is required to generate the common keys.

The safety provided by the scheme of the present invention is now discussed.

It is known that one of the conditions necessary to a safe ID-NIKS is the inability of separating the secret key generating functions and key sharing functions in polynomial time. A fact that the scheme of the present invention satisfies this necessary condition is described below.

Secret Key Generating Function:

The scheme of the present invention has a total of K secret key generating functions as indicated in formulas 5 and 6 below.

$$f_1(\vec{x}) = g^{\alpha_{ij} H_1[\vec{x}]} \quad (j=1) \tag{5}$$

$$f_j(\vec{x}) = \alpha_{ij} H_j[\vec{x}] \quad (j=2, \ldots, K) \tag{6}$$

If H is an arbitrary symmetrical matrix, then the referencing function [·] is clearly indivisible, as shown in formulas 7 and 8 below.

$$H[\vec{x}+\vec{y}] \neq H[\vec{x}] + H[\vec{y}] \tag{7}$$

$$H[\vec{x}+\vec{y}] \neq H[\vec{x}] \cdot H[\vec{y}] \tag{8}$$

Thus, the K secret key generating functions represented in formulas 5 and 6 are indivisible, as shown in formula 9 below.

$$f_j(\vec{x}+\vec{y}) \neq f_j(\vec{x}) \circ f_j(\vec{y}) \quad (j=1, 2, \ldots, K) \tag{9}$$

Key Sharing Function:

The key sharing function in the scheme of the present invention is represented in formula 10 below.

$$F(\vec{x}, \vec{y}) = g^{H_1[\vec{x}_1][\vec{y}_1] \cdots H_K[\vec{x}_K][\vec{y}_K]} \tag{10}$$

As in the case of the secret key generating functions, the key sharing function represented in formula 10 is indivisible, as shown in formula 11 below.

$$F(\vec{a}, \vec{x}+\vec{y}) \neq F(\vec{a}, \vec{x}) \circ F(\vec{a}, \vec{y}) \tag{11}$$

Attacks for breaking cryptosystems by the collusion of an indefinite number of entities (hereinafter "non-corrupting collusion") has been debated for quite some time. At the same time, attacks conducted by a smaller number of collaborators wherein only entities necessary for the attack are bought (hereinafter "corrupting collusion") are also effective if a certain individual is the only target. The safety of the scheme of the present invention against such corrupting and non-corrupting collusions is now considered.

Safety Against Non-Corrupting Collusion:

In cases where it is possible to represent the ID vector of any entity by a linear combination of collaborator ID vectors (combination attack) and either the secret key generating function or key sharing function is divisible in polynomial time, it is possible to counterfeit the secret keys of other entities from the secret keys of the collaborators (separation attack). Such an attack is known as a linear attack.

In the scheme of the present invention, the ID vector of any entity can be represented as a linear combination by using the ID vectors of L collaborators who are linearly independent. That is, a combination attack by L or more entities is viable. However, because the secret key generating functions and key sharing function are indivisible functions, as noted earlier, the secret key and common key of that entity cannot be counterfeited by a separation attack even in the unlikely case where a combination attack against any entity should become viable. Therefore the linear attack does not work with the scheme of the present invention. Accordingly, in the face of a non-corrupting collusion, the scheme of the present invention has a collusion threshold (minimum number of collaborators required for combination attack) that is far higher than L.

Safety Against Corrupting Collusion:

In cases where an attack is made against the scheme of the present invention wherein a specific entity is targeted, a random number substitution attack like that described below is conceivable wherein all of the entities required for the attack are bought out and all of the secret keys of the bought-out entities are used.

The situation is described in an example where the name is four Kanji characters (L=4×16=64 bits) so that the entity ID is easy to understand and each Kanji character is treated as 1 block. In other words, it is assumed that K=4 and M=16.

A case is now considered wherein the IDs of entities Z, A, B, C, and D are set as noted below, entities A, B, C, and D are bought out, and entity Z is attacked.

$$\vec{I_Z} = [辻 | 井 | 重 | 男]$$
$$\vec{I_A} = [辻 | 本 | 恵 | 子]$$
$$\vec{I_B} = [中 | 井 | 邦 | 夫]$$
$$\vec{I_C} = [山 | 田 | 重 | 人]$$
$$\vec{I_D} = [佐 | 藤 | 和 | 男]$$

The secret key of entity Z is then given as follows.

$$\vec{s_{Z_1}} \equiv g^{\alpha_{Z1} H_1[辻]} \pmod{P}$$
$$\vec{s_{Z_2}} \equiv \alpha_{Z2} H_2[井] \pmod{P-1}$$
$$\vec{s_{Z_3}} \equiv \alpha_{Z3} H_3[重] \pmod{P-1}$$
$$\vec{s_{Z_4}} \equiv \alpha_{Z4} H_4[男] \pmod{P-1}$$

The collaborators make the following computations and counterfeit the secret key of entity Z.

$$\vec{s_{Z_1}}' \equiv \vec{s_{A_1}} \equiv g^{\alpha_{A1} H_1[辻]} \pmod{P}$$

$$\vec{s_{Z_2}}' \equiv \frac{s_{A_2}[井]}{s_{B_2}[本]} \cdot s_{B_2} \equiv \frac{\alpha_{A2} H_2[本][井]}{\alpha_{B2} H_2[井][本]} \cdot \alpha_{B2} H_2[井]$$
$$\equiv \alpha_{A2} H_2[井] \pmod{P-1}$$

$$\vec{s_{Z_3}}' \equiv \frac{s_{A_3}[重]}{s_{C_3}[恵]} \cdot s_{C_3} \equiv \frac{\alpha_{A3} H_3[恵][重]}{\alpha_{C3} H_3[重][恵]} \cdot \alpha_{C3} H_3[重]$$
$$\equiv \alpha_{A3} H_3[重] \pmod{P-1}$$

$$\vec{s_{Z_4}}' \equiv \frac{s_{A_4}[男]}{s_{D_4}[子]} \cdot s_{D_4} \equiv \frac{\alpha_{A4} H_4[子][男]}{\alpha_{D4} H_4[男][子]} \cdot \alpha_{D4} H_4[男]$$
$$\equiv \alpha_{A4} H_4[男] \pmod{P-1}$$

It may be seen here that the counterfeited vectors $s_{Z_1}'$ to $s_{Z_4}'$ work in the same manner as the vectors $s_{Z_1}$ to $s_{Z_4}$ respectively. Hence the collusion attack is definitely viable against the scheme of the present invention in situations where it is possible to buy out enough entities to mount the attack.

In order for this corrupting collusion attack to be viable, however, it is necessary to acquire the secret keys of a collaborator having exactly the same ID division vectors as the K number of ID division vectors of the entity targeted for attack. For some specific block, only one entity in $2^M$ entities has exactly the same ID division vectors. Buying all of the K blocks for this special entity, even assuming the values M=10 and K=100, is hardly an easy task. Accordingly, the scheme of the present invention may be said to be safe against corrupting collusions. The parameters M and K can be suitably set according to the scale of the cryptosystem and/or to the degree of safety required.

Now, in order to circumvent a random number substitution attack by corrupting collusion, it is only necessary to implement measures to prevent the division blocks from being independently attacked. In other words, it is only necessary to make it so that the random number terms disappear only after the computation of all of the blocks is complete. With this perspective, two embodiment are now described which represent improvements of the first embodiment.

2nd Embodiment

Another example of the present invention (2nd embodiment) is now described which is made stronger against random number substitution attack by combining a random number elimination method.

Preliminary Processing at Centers 1:

As in the first embodiment, the centers 1 prepare public keys and secret keys as follows and disclose the public keys.

| | | |
|---|---|---|
| Public key | P | Large prime number |
| | L | Size of ID vector (L = KM) |
| | K | Number of ID vector division blocks |
| | M | Size of divided ID vector |
| Secret key | g | GF (P) primitive element |
| | $H_j$ | Symmetrical $2^M \times 2^M$ matrix formed of random numbers (j = 1, 2, . . . , K) |
| | $\alpha_i$ | Personal secret random number of entity i (where $\alpha_{i1}\alpha_{i2} \ldots \alpha_{iK} \equiv 1$ (mod P − 1)) |

In order to employ the safety of RSA ciphers, P is set so that it is very difficult to factor P−1 into prime numbers. To do that it is only necessary to use a prime number such that P=2pq+1 (where p and q are prime).

As in the first embodiment, the ID vector of each of the entities is divided into K blocks (ID division vectors) having a block size M (cf. FIG. 2 and formula 1).

Furthermore, as indicated in formula 12 below, a hashing function h(·) for generating a second ID vector $v_i$ of K-1 dimension from the ID is disclosed by the centers 1. The components of this second ID vector $v_i$ generated with the hashing function take positive integers, and it is assumed that the sum thereof is a comparatively small constant e as represented in formula 13 below.

$$\vec{v_i} = (v_{i2}, v_{i3}, \ldots, v_{iK}) = h(ID_i) \quad (12)$$

$$\sum_{j=2}^{K} v_{ij} = e \quad (13)$$

Entity Registration Processing:

When the centers 1 are requested by an entity i for registration, K secret vectors $s_{ij}$ (j=1, 2, . . . , K) corresponding, respectively, to a prepared key and K ID division vectors for entity i are found according to formulas 14-1, 14-2, . . . , 14-K, as represented below, the vectors $s_{ij}$ so found are sent to entity i in secret, and registration is complete.

$$\vec{s_{i1}} \equiv g^{\alpha_i^{-e} H_1[\vec{I_{i1}}]} \pmod{P} \quad (14\text{-}1)$$

$$\vec{s_{i2}} \equiv \alpha_i H_2[\vec{I_{i2}}]^{v_{i2}} \pmod{P-1} \quad (14\text{-}2)$$

$$\vdots$$

$$\vec{s_{iK}} \equiv \alpha_i H_K[\vec{I_{iK}}]^{v_{iK}} \pmod{P-1} \quad (14\text{-}K)$$

Processing for Generating Common Key Between Entities:

Entity i uses the disclosed hashing function h (·) to derive the second ID vector for an opposite entity m, namely $v_m$, according to formula 15 below.

$$\vec{v_m} = (v_{m2}, v_{m3}, \ldots, v_{mK}) \quad (15)$$
$$= h(ID_m)$$

Entity i selects from its own secret key vectors $s_{i1}$ a vector $s_{i1}$ [vector $I_{m1}$] of the component corresponding to vector $I_{m1}$ that is the ID division vector of entity m, and also selects from among the secret key vectors $s_{ij}$ for the blocks j (j=2, ..., K) the vector $s_{ij}$ [vector $I_{mj}$] of the component corresponding to the vector $I_{mj}$. Then, entity i sequentially performs power-multiplications, repeatedly for $v_{mj}$ times, on all the vectors $s_{ij}$ [vector $I_{mj}$] (j=2, ..., K) except for vector $s_{i1}$ [vector $I_{m1}$], with modulo P and the vector $s_{i1}$ [vector $I_{m1}$] as the base, thereby deriving the common key $K_{im}$. The computation formula for finding this $K_{im}$ specifically becomes formula 16 below. This $K_{im}$ coincides with the common key $K_{mi}$ obtained by the entity m.

$$K_{im} = \vec{s_{i1}}[\vec{I_{m1}}]^{\vec{s_{i2}}[\vec{I_{m2}}]^{v_{m2}} \cdots \vec{s_{iK}}[\vec{I_{mK}}]^{v_{mK}}} \quad (16)$$
$$= g^{\alpha_i^{-e} \alpha_i^e \cdot H_1[i1][m1] \cdot H_2[i2][m2]^{v_{m2}} \cdots H_K[iK][mK]^{v_{mK}}}$$
$$= g^{H_1[i1][m1] \cdot H_2[i2][m2]^{v_{m2}} \cdots H_K[iK][mK]^{v_{mK}}} \pmod{P}$$

where $\vec{[I_{ij}]}$ is abbreviated $_{[ij]}$ from the second equation on

Safety Against Random Number Substitution Attack:

Generally, in actual examples of the aforementioned entities A and B, we will have $v_{A2} \neq v_{B2}$, so that as shown below in formula 17, the random number substitution attack is not viable.

$$\vec{s_{Z_2}}' \equiv \frac{\vec{s_{A_2}}[\#]}{\vec{s_{B_2}}[\text{本}]} \cdot \vec{s_{B_2}} \quad (17)$$
$$= \frac{\alpha_A H_2[\text{本}][\#]^{v_{A2}}}{\alpha_B H_2[\#][\text{本}]^{v_{B2}}} \cdot \alpha_B H_2[\#]$$
$$\not\equiv \alpha_A H_2[\#] \pmod{P-1}$$

3rd Embodiment

Another example (third embodiment) of the present invention is now described wherewith the personal random number elimination process is rendered complex by the addition of a constant term.

Preliminary Processing at Centers 1:

As in the first embodiment, the centers 1 prepare public keys and secret keys as follows and disclose the public keys.

| Public key | N | N = PQ (where P and Q are large prime numbers) |
|---|---|---|
| | L | Size of ID vector (L = KM) |
| | K | Number of ID vector division blocks |
| | M | Size of divided ID vector |
| Secret key | g | Maximum generating element with modulo N |
| | $H_j$ | Symmetrical $2^M \times 2^M$ matrix formed of random numbers (j = 1, 2, ..., K) |
| | $\alpha_{ij}$ | Personal secret random number of entity i where $\alpha_{i1}\alpha_i \alpha_{iK} \equiv 1 \pmod{\lambda(N)}$ and $\lambda(\cdot)$ is Carmichael function |

Also, as in the first embodiment, the ID vector of each entity is divided into K blocks (ID division vectors) having a block size of M (cf. FIG. 2 and formula 1).

Entity Registration Processing:

When the centers 1 are requested by an entity i for registration, K secret vectors $s_{ij}$ (j=1, 2, ..., K-1, K) corresponding, respectively, to a prepared key and K ID division vectors for entity i are found according to formulas 18-1, 18-2, ..., 18-K-1, 18-K, as represented below.

$$\vec{s_{i1}} \equiv g^{\alpha_{i1} H_1[\vec{I_{i1}}]} \pmod{N} \quad (18\text{-}1)$$

$$\vec{s_{i2}} \equiv \alpha_i H_2[\vec{I_{i2}}] + \beta_{i2} \quad (18\text{-}2)$$

$$\vdots$$

$$\vec{s_{i,K-1}} \equiv \alpha_i H_{K-1}[\vec{I_{i,K-1}}] + \beta_{i,K-1} \quad (18\text{-}K\text{-}1)$$

$$\vec{s_{iK}} \equiv \alpha_{iK} H_K[\vec{I_{iK}}] \quad (18\text{-}K)$$

The third embodiment further adds K-2 personal random numbers $\beta_{i2}, \ldots, \beta_{i,K-1}$ to the first embodiment wherein $\alpha_{i2} = \ldots \alpha_{i,K-1} = \alpha_i$ and $\alpha_{i1} \alpha_i \alpha_{iK} = 1 \pmod{\lambda(N)}$. The centers 1 derive the vectors $t_i$ according to formula 19 below. It should be assumed here that $\beta_i = \beta_{i2} + \ldots + \beta_{i,K-1}$. The derived vectors $s_{ij}$ and $t_i$ are sent to entity i in secret and registration is complete.

$$\vec{t_i} \equiv g^{-\alpha_{i1} H_1[\vec{I_{i1}}] \beta_i} \pmod{N} \quad (19)$$

Processing for Generating Common Key Between Entities:

Entity i first, from the secret key vectors $s_{ij}$ for the blocks j (j=2, ..., K-1), selects column vectors $s_{ij}$[vectors $I_{mj}$] corresponding to the vectors $I_{mj}$ that are the ID division vectors of entity m, block by block, and finds the sum $S_{im}$ thereof by formula 20 below.

$$S_{im} = \sum_{j=2}^{K-1} \vec{s_{ij}}[\vec{I_{mj}}] \quad (20)$$

$$= \alpha_i \sum_{j=2}^{K-1} H_j[\vec{I_{ij}}][\vec{I_{mj}}] + \beta_i$$

Entity i, from among the secret key vector $s_{i1}$ for its own first block and the secret key vector $s_{iK}$ for the last block, selects the column corresponding to the vectors $I_{mj}$ that are the ID division vectors of entity m, and performs the calculation shown below in formula 21 using $s_{im}$ and vectors $t_i$ to derive the common key $K_{im}$. This $K_{im}$ coincides with the common key $K_{mi}$ derived by entity m.

$$K_{im} \equiv \left(\vec{t_i}[\vec{I_{m_1}}] \cdot \vec{s_{i_1}}[\vec{I_{m_1}}]^{s_{im}}\right)^{\vec{s_{iK}}[\vec{I_{mK}}]} \quad (21)$$

$$\equiv g^{\alpha_{i_1}\alpha_i\alpha_{iK}\cdot H_{1[i/][m/]}\left(\sum_{j=2}^{K-1} H_{j[i,j][mj]}\right)H_{K[iK][mK]}}$$

$$\equiv g^{H_{1[i/][m/]}\left(\sum_{j=2}^{K-1} H_{j[ij][mj]}\right)H_{K[iK][mK]}} \pmod{N}$$

where $\vec{I_{ij}}$ is abbreviated $_{[ij]}$ from the second equation on

Safety Considerations:

In this formula, if settings are made as in formula 22 below, the expression $K_{im}=x_{im2} \, x_{im3} \ldots x_{im,K-1}$ will result, and, by gathering together numerous formulas wherein $x_{im2}$, $x_{im3}, \ldots, x_{im,K-1}$ are variables, it is theoretically possible to counterfeit keys.

$$x_{im2} = g^{H_{1[i1][m1]}H_{2[i2][m2]}H_{K[iK][mK]}} \quad (22)$$

$$x_{im3} = g^{H_{1[i1][m1]}H_{3[i3][m3]}H_{K[iK][mK]}}$$

$$\vdots$$

$$x_{im,K-1} = g^{H_{1[i1][m1]}H_{K-1[i,K-1][m,K-1]}H_{K[iK][mK]}}$$

However, with the scheme of the present invention, the mathematical structures are held down to a minimum, and there is no structure in their variables that is separable, whereupon it becomes necessary to attack all of these variables as independent variables, thus requiring an extremely enormous number of collaborators. Even if the final block is susceptible to elimination by a random number substitution attack, the terms expressed in formula 22 must be attacked as independent variables. Thus, in the case where M=10, for example, it becomes necessary to amass $2^{20}$ specific equations in order to attack, so safety is enhanced.

Although the third embodiment pertains to a case wherein a composite number N difficult of prime factoring is used as the modulus, the same thing can of course be done in the case where N=P.

4th Embodiment

Figure 4:
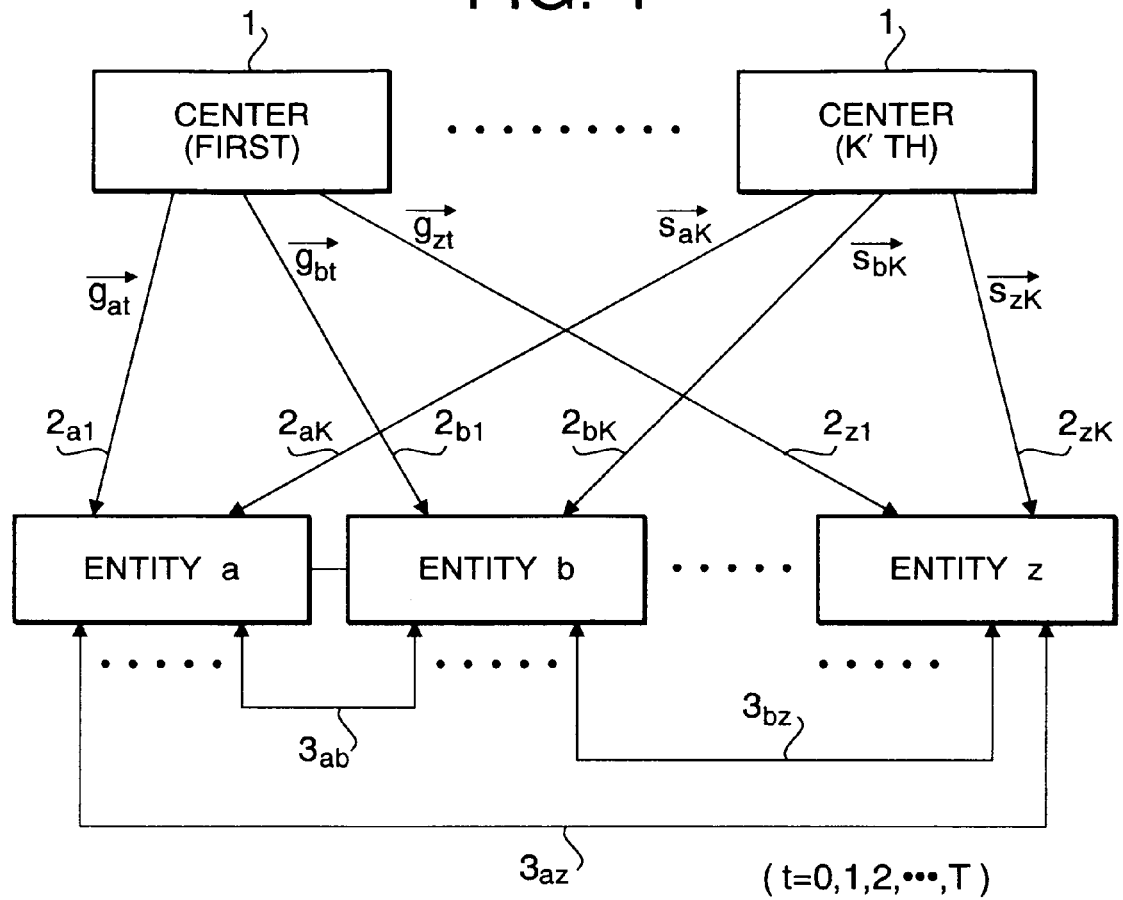
FIG. 4 is a diagram representing the configuration of another cryptographic communications system according to the present invention.

FIG. 4 is a model diagram showing the configuration of a cryptographic communications system of the present invention. A plurality (K) of centers 1 which can be trusted to maintain information confidentiality are established. These centers 1 may be public institutions in a society, for example.

These centers 1 and a plurality of entities a, b, . . . , z that are users of this cryptosystem are connected by secret communication paths $2_{a1}, \ldots, 2_{aK}, 2_{b1}, \ldots, 2_{bK}, \ldots, 2_{z1}, \ldots, 2_{zK}$. Thus secret key information can be sent to the entities a, b, . . . , z from the centers 1 via the secret communication paths. Communication paths 3ab, 3az, 3bz, etc., are also deployed between pairs of entities so that ciphertext resulting from encrypting communications information can be sent back and forth between entities via those communication paths 3ab, 3az, 3bz, etc.

Preparatory Processing at Centers 1:

The centers 1 prepare public keys and secret keys as shown below, and discloses the public keys.

| | | |
|---|---|---|
| Public key | N | N = PQ |
| | K | Number of ID vector division blocks |
| | $M_j$ | Size of divided ID vector (where j = 1, 2, . . . , K) |
| | L | Size of ID vector (L = $M_1$ + $M_2$ + . . . + $M_K$) |
| | T | Degree of exponent portion |
| Secret key | P,Q | Large prime numbers |
| | g | Maximum generating element with modulo N |
| | $H_j$ | Symmetrical $2^{Mj} \times 2^{Mj}$ matrix formed of random numbers |
| | $\alpha_i$ | Personal secret random number of entity i (where gcd $(\alpha_i, \lambda(N)) = 1$ and $\lambda(\cdot)$ is Carmichael function) |
| | $\beta_{ij}$ | Personal secret random number of entity i (where $\beta_{i1} + \beta_{i2} + \ldots + \beta_{iK} = \lambda(N)$) |

Figure 5:
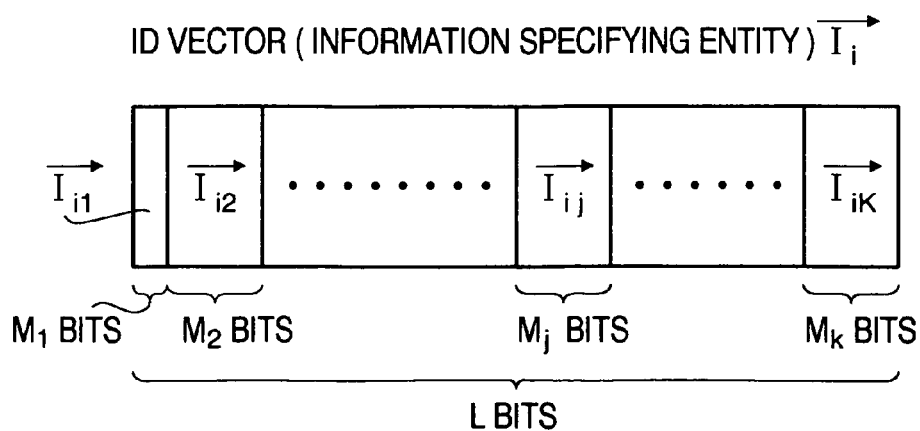
FIG. 5 depicts another example of entity ID vector division.

It should be assumed that ID vectors that are specifying information indicating the names and addresses of entities are L-dimension binary vectors, and each of their ID vectors is divided into K blocks (block sizes are $M_1, M_2, \ldots, M_K$), as diagrammed in FIG. 5. The ID vector for entity i (i.e. vector $I_i$), for example, is divided as indicated in formula 23 below. The vectors $I_{ij}$ (j=1, 2, . . . , K), that are divided specifying information, are called ID division vectors.

$$\vec{I_i} = [\vec{I_{i1}} | \vec{I_{i2}} | \cdots | \vec{I_{iK}}] \quad (23)$$

Entity Registration Processing:

When the centers 1 are requested by an entity i for registration, K secret key vectors $s_{ij}$ (j=1, 2, . . . , K) corresponding, respectively, to a prepared key and K ID division vectors for entity i are calculated according to formulas 24-1, 24-2, . . . , 24-j, . . . , 24-K below.

$$\vec{s_{i1}} = \alpha_i H_1[\vec{I_{i1}}] + \beta_{i1}\vec{1} \quad (24\text{-}1)$$

$$\vec{s_{i2}} = \alpha_i H_2[\vec{I_{i2}}] + \beta_{i2}\vec{1} \quad (24\text{-}2)$$

$$\vdots$$

$$\vec{s_{ij}} = \alpha_i H_j[\vec{I_{ij}}] + \beta_{ij}\vec{1} \quad (24\text{-j})$$

$$\vdots$$

$$\vec{s_{iK}} = \alpha_i H_K[\vec{I_{iK}}] + \beta_{iK}\vec{1} \quad (24\text{-K})$$

Vector 1 represents a vector of K dimension wherein all of the components are 1. The representation $H_j$ [vector $I_{ij}$]

indicates a row, corresponding to the vector $I_{ij}$, extracted from the symmetrical matrix $H_j$, and the [·] operation is also defined for reference.

Next, for the 1st block, T+1 secret key vectors $g_{it}$ (t=0, 1, 2, ..., T) are calculated according to formulas 25-0, 25-1, 25-2, ..., 25-t, ..., 25-T below.

$$\vec{g_{i0}} \equiv g^{\alpha_i^{-T} \vec{1}} \pmod{N} \quad (25\text{-}0)$$

$$\vec{g_{i1}} \equiv g^{\alpha_i^{-T} \vec{s_{i1}}} \pmod{N} \quad (25\text{-}1)$$

$$\vec{g_{i2}} \equiv g^{\alpha_i^{-T} (\vec{s_{i1}})^2} \pmod{N} \quad (25\text{-}2)$$

$$\vdots$$

$$\vec{g_{it}} \equiv g^{\alpha_i^{-T} (\vec{s_{i1}})^t} \pmod{N} \quad (25\text{-}t)$$

$$\vdots$$

$$\vec{g_{iT}} \equiv g^{\alpha_i^{-T} (\vec{s_{i1}})^T} \pmod{N} \quad (25\text{-}T)$$

It should be assumed that when c is a scalar and A and B indicated in formulas 26 and 27 are matrixes, the expressions $B=c^A$ and $B=<A>^c$ correspond to formulas 28 and 29, respectively.

$$A=(a_{\mu\nu}) \quad (26)$$

$$B=(b_{\mu\nu}) \quad (27)$$

$$b_{\mu\nu}=c^{a_{\mu\nu}} \quad (28)$$

$$b_{\mu\nu}=a_{\mu\nu}^c \quad (29)$$

One of the centers 1 sends the T+1 secret key vectors $g_{it}$ (t=0, 1, 2, ..., T) relating to 1st block to entities i in secret, while the remaining (K-1) centers 1 send K-1 secret key vectors $s_{ij}$ (j=2, 3, ..., K) relating to the blocks from the second to the last to entities i in secret.

Processing for Generating Common Key Between Entities:

Entity i, for the 1st block, selects from its own T+1 secret key vectors $g_{it}$ a vector $g_{it}$ [vector $I_{m1}$] of the component corresponding to vector $I_{m1}$ that is the ID division vector of entity m. The vectors selected are represented below in formulas 30-0, 30-1, ..., 30-t, ... 30-T.

$$g_{0im} = \vec{g_{i0}}[\vec{I_{m1}}] \quad (30\text{-}0)$$

$$g_{1im} = \vec{g_{i1}}[\vec{I_{m1}}] \quad (30\text{-}1)$$

$$\vdots$$

$$g_{tim} = \vec{g_{it}}[\vec{I_{m1}}] \quad (30\text{-}t)$$

$$\vdots$$

$$g_{Tim} = \vec{g_{iT}}[\vec{I_{m1}}] \quad (30\text{-}T)$$

Next, entity i, for the blocks 2, 3, ..., K for j=2, 3, ..., K, selects, from its own secret key vectors $s_{ij}$, vectors $s_{ij}$ [vectors $I_{mj}$] of the components corresponding to vectors $I_{mj}$ that are the ID division vectors of entity m, block by block. The vectors selected are represented below in formulas 31-2, ..., 31-J, ..., 31-K.

$$x_{2im} = \vec{s_{i2}}[\vec{I_{m2}}] \quad (31\text{-}2)$$

$$\vdots$$

$$x_{jim} = \vec{s_{ij}}[\vec{I_{mj}}] \quad (31\text{-}j)$$

$$\vdots$$

$$x_{Kim} = \vec{s_{iK}}[\vec{I_{mK}}] \quad (31\text{-}K)$$

Then, the sum $y_{im}$ for all of these is found on the integer ring as in formula 32 below.

$$y_{im} = \sum_{j=2}^{K} x_{jim} \quad (32)$$

And, by performing calculation as in formula 33 below, with modulo N, the common key $K_{im}$ is derived. In the calculation in this formula 33, by completing the calculations for all of the blocks, the personal secret random number $\alpha_i$ is eliminated by multiplication by the inverse element thereof, and the personal secret random numbers $\beta_{ij}$, which are K in number, are eliminated by additions therefor. This $K_{im}$ coincides with the common key $K_{mi}$ derived by entity m.

$$\begin{aligned} K_{im} &\equiv \prod_{t=0}^{T} g_{tim}^{T C_t y_{im}^{(T-t)}} \\ &\equiv g^{\alpha_i^{-T} \sum_{t=0}^{T} T C_t x_{1im}^t y_{im}^{T-t}} \\ &\equiv g^{\alpha_i^{-T} (x_{1im} + y_{im})^T} \\ &\equiv g^{\alpha_i^{-T} (x_{1im} + \cdots + x_{Kim})^T} \\ &\equiv g^{\alpha_i^{-T} (\alpha_i H_1 [\vec{I_{i_1}}][\vec{I_{m_1}}] + \beta_{i1} + \cdots + \alpha_i H_K [\vec{I_{iK}}][\vec{I_{mK}}] + \beta_{iK})^T} \\ &\equiv g^{\alpha_i^{-T} \{\alpha_i (H_1 [\vec{I_{i_1}}][\vec{I_{m_1}}] + \cdots + H_K [\vec{I_{iK}}][\vec{I_{mK}}]) + \lambda(N)\}^T} \\ &\equiv g^{\alpha_i^{-T} \{\alpha_i (H_1 [\vec{I_{i_1}}][\vec{I_{m_1}}] + \cdots + H_K [\vec{I_{iK}}][\vec{I_{mK}}])\}^T} \\ &\equiv g^{(H_1 [\vec{I_{i_1}}][\vec{I_{m_2}}] + \cdots + H_K [\vec{I_{iK}}][\vec{I_{mK}}])^T} \pmod{N} \end{aligned} \quad (33)$$

In the formula above we assumed $x_{1im}$=vector $s_{i1}$ [vector $I_{m1}$], but this is not even known to entity i itself. Also, because T is a comparatively small number, the exponent portion can be calculated by successively and repeatedly performing power multiplication.

In the example described in the foregoing, the size $M_j$ of the blocks may be constant for all blocks or, alternatively, some or all of the blocks may have different sizes. However, the secret key vector $g_{it}$ is derived in relation to the 1st block, wherefore, when that size is made constant for all blocks, the secret becomes large for the 1st block. Thus, it is better to make the size of the 1st block smaller than the sizes of the other blocks. When $M_1=1$, in particular, the secrets distributed can be minimized and safety most enhanced.

Let us now consider the safety of the present invention against a collusive attack such as an attack against the whole cryptosystem by the collusion of a large indefinite number of entities. If the total number of entities is 1 million, then $1000000 \approx 2^{20}$, wherefore $M_j=1$ and K=20. If T=32, then the number of exponent portion terms in the common key $K_{im}$ becomes $_{20}H_{32}=_{51}C_{32}\approx 4.85\times 10^{13}$. This number of terms exceeds the total number of keys shared between all entities, namely $_{1000000}C_2\approx 5\times 10^{12}$. Accordingly the condition that number of terms>total number of shared keys is satisfied and safety against collusive attack is realized.

Figure 6:
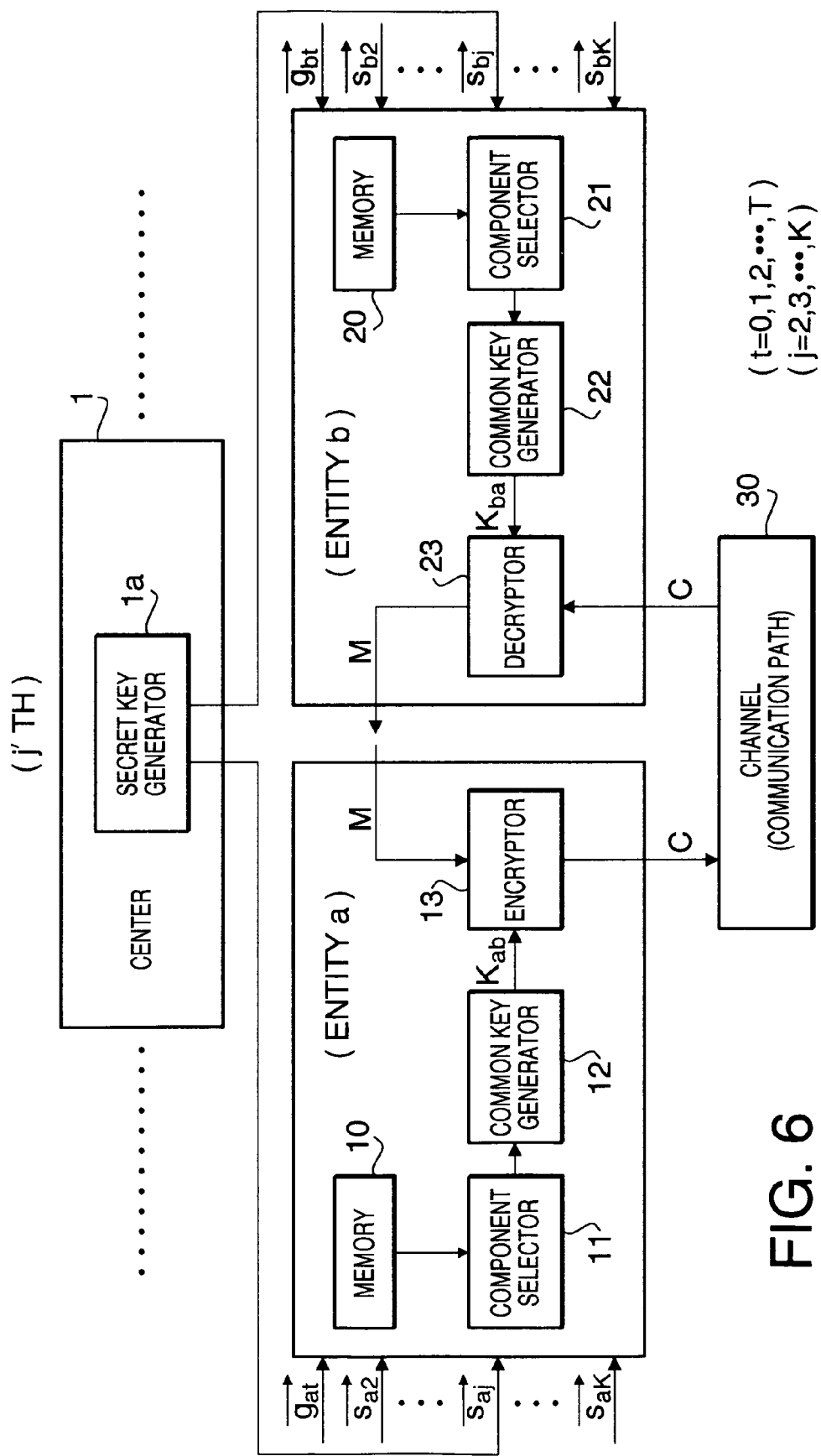
FIG. 6 is a diagram showing how information is communicated between two entities.

The communication of information between entities in the cryptosystem described in the foregoing is described next. FIG. 6 is a model diagram showing how information is communicated between two entities a and b. In the example diagrammed in FIG. 6, entity a encrypts a plaintext (message) M to the ciphertext C which it sends to entity b, and entity b decrypts that ciphertext C back to the original plaintext (message) M.

The first of the centers 1 is equipped with a secret key generator 1a which computes secret key vectors $s_{a1}$ and $s_{b1}$ peculiar to the entities a and b, and the secret key vectors $g_{at}$ and $g_{bt}$ (t=0, 1, 2, . . . , T) numbering T+1, according to the formulas 24-1, 25-0, . . . , 25-T given earlier. Then, when registration requests are made by the entities a and b, the secret key vectors $g_{at}$ and $g_{bt}$ for those entities a and b are sent to the entities a and b.

The j'th center 1 (where j=2, 3, . . . , K) is equipped with a secret key generator 1a for computing the secret key vectors $s_{aj}$ and $s_{bj}$ peculiar to the entities a and b according to the formulas 24-2, . . . , 24-K given earlier. When registration requests are made by the entities a and b, the secret key vectors $s_{aj}$ and $s_{bj}$ for those entities a and b are sent to the entities a and b.

Entity a is provided with a memory 10 for storing, in tabular form, the secret key vectors $g_{at}$ (t=0, 1, 2, . . . , T) and $s_{aj}$ (j=2, 3, . . . , K) sent from the centers 1, a component selector 11 for selecting from among those secret key vectors the vector $g_{at}$ [vector $I_{b1}$] (t=0, 1, 2, . . . , T) and the vector $s_{aj}$ [vector $I_{bj}$] (j=2, 3, . . . , K) for the components corresponding to entity b, a common key generator 12 for generating the common key $K_{ab}$ with entity b derived by entity a using those components selected, and an encryptor 13 for encrypting the plaintext (message) M to the ciphertext C using the common key $K_{ab}$ and outputting it over the channel 30.

Entity b is provided with a memory 20 for storing, in tabular form, the secret key vectors $g_{bt}$ (t=0, 1, 2, . . . , T) and $s_{bj}$ (j=2, 3, . . . , K) sent from the centers 1, a component selector 21 for selecting from among the secret key vectors the vector $g_{bt}$ [vector $I_{a1}$] (t=0, 1, 2, . . . , T) and the vector $s_{bj}$ [vector $I_{aj}$] (j=2, 3, . . . , K) for the components corresponding to entity a, a common key generator 22 for generating the common key $K_{ba}$ with entity a derived by entity b using those components selected, and a decryptor 23 for decrypting the ciphertext C input from the channel 30 to the plaintext M using the common key $K_{ba}$ and outputting it.

When information is to be sent from entity a to entity b, first, the secret key vectors $g_{at}$ (t=0, 1, 2, . . . , T) and $s_{aj}$ (j=2, 3, . . . , K) pre-stored in the memory 10 after being derived at the centers 1 are read out to the component selector 11. The component selector 11 then selects the vector $g_{at}$ [vector $I_{b1}$] (t=0, 1, 2, . . . , T) and the vector $s_{aj}$ [vector $I_{bj}$] (j=2, 3, . . . , K) that are the components corresponding to entity b and sends them to the common key generator 12. The common key generator 12 uses these components to derive the common key $K_{ab}$ according to formula 33, and sends the common key $K_{ab}$ to the encryptor 13. The encryptor 13 utilizes this common key $K_{ab}$ to encrypt the plaintext M to the ciphertext C and sends the ciphertext C via the channel 30.

The ciphertext C sent over the channel 30 is input to the decryptor 23 of entity b. The secret key vectors $s_{bj}$ (j=2, 3, . . . , K) and $g_{bt}$ (t=0, 1, 2, . . . , T) derived at the centers 1 and prestored in the memory 20 are read out to the component selector 21. Then, the component selector 21 selects the vector $g_{bt}$ [vector $I_{a1}$] (t=0, 1, 2, . . . , T) and the vector $s_{bj}$ [vector $I_{aj}$] (j=2, 3, . . . , K) that are components corresponding to entity a and sends them to the common key generator 22. The common key generator 22 uses these components to derive the common key $K_{ba}$ according to formula 33 and sends this common key to the decryptor 23. The decryptor 23 uses the common key $K_{ba}$ to decrypt the ciphertext C to the plaintext M.

In the above-described example, centers are deployed in a plurality, and these centers generate a plurality of keys corresponding to a plurality of units (pieces) of entity ID information respectively. In other words, each center generates a key for a certain segment of entity ID information. Therefore no single center can hold all entity secrets, and the centers cannot become "big brothers." Also, the secret key vectors peculiar to the respective entities are stored beforehand in the memories of the entities, so the time required for generating common keys can be shortened.

Figure 7:
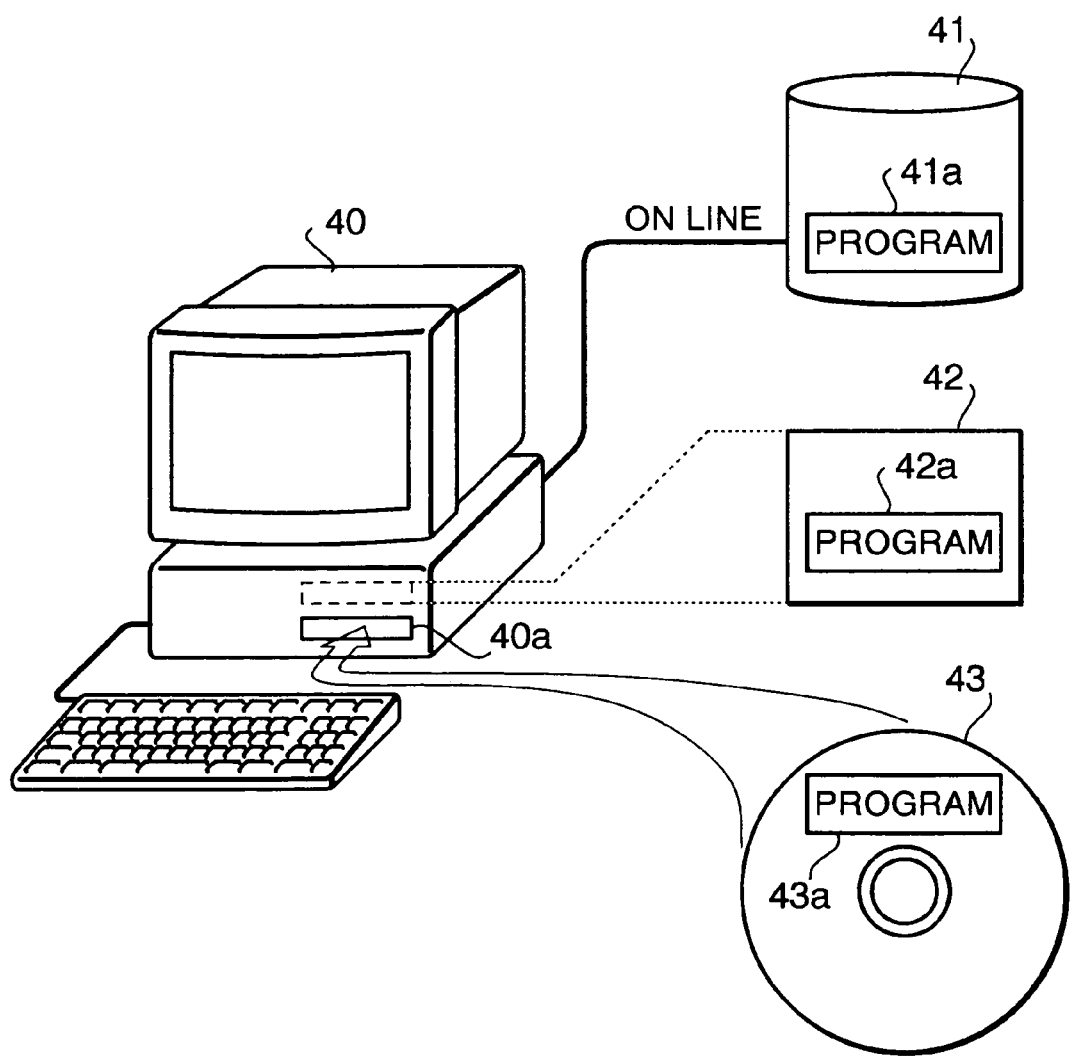
FIG. 7 is a diagram showing the configuration of a recording media.

FIG. 7 is a configurational diagram of an embodiment of recording media according to the present invention. The program exemplified here, which is recorded on recording media described below, comprises processes for selecting components corresponding to entity m from among the secret key vectors $s_{ij}$ and $g_{it}$ sent to entity i from the centers and processes for finding a common key $K_{im}$ using those components so selected. A computer 40 is provided at each entity.

In FIG. 7, a recording medium 41 that connects the computer 40 online employs a WWW (world wide web) server computer, for example, located remotely from the site where the computer 40 is installed. A program 41a such as that described above is recorded on the recording medium 41. The program 41a read out from the recording medium 41 controls the computer 40 and thereby computes common keys at the entities for other entities to be communicated with.

A recording medium 42 provided internally in the computer 40 is a built-in hard disk drive or ROM, for example, and a program 42a as described above is recorded on the recording medium 42. The program 42a read out from the recording medium 42 controls the computer 40 and thereby computes common keys at the entities for other entities to be communicated with.

A recording medium 43 loaded in a disk drive 40a of the computer 40 is a portable optical-magnetic disk, CD-ROM, or flexible disk, etc. A program 43a such as described above is recorded on the recording medium 43. The program 43a retrieved from the recording medium 43 controls the computer 40 and thereby computes common keys at the entities for other entities to be communicated with.

With the present invention, as described in the foregoing, entity ID information is divided into a plurality of segments or pieces and a plurality of centers are established for these entity ID information pieces respectively such that each of the centers generates a particular key for a particular piece of entity ID information. Therefore, no single center can grasp all entity secrets or can become a "big brother." In addition, the mathematical structures are held down to a minimum, so that it is easy both to effectively circumvent the collusion problem and to implement the cryptosystem. Furthermore, because the entities are in possession beforehand of secret keys peculiar thereto, the time required for generating common keys can be significantly shortened.

With an ID-NIKS based on the third conventional method described earlier, in general, L×L symmetrical matrixes are center secrets, and a portion of that information is treated as a vector comprising L components and distributed to the entities. This scheme is very easy to implement but the collusion threshold is no more than approximately L. With the scheme of the present invention, on the other hand, a collusion threshold can be obtained which is far greater than L.

With the conventional scheme, by employing $2^M \times 2^M$ center secret matrixes, it is possible to configure an ID-NIKS having the same level of collusion threshold as the present invention. An ID-NIKS configured in such manner is not practical, however, because it requires $2^M$ product computations or power-multiplication computations for key sharing. Another problem with such an ID-NIKS is that almost all schemes are divisible so that secret keys can be counterfeited for entities expressed by the linear combination of some collaborators. With the scheme of the present invention, on the other hand, the number of secret keys held becomes more numerous, but the common keys can be shared by making K-1 power-multiplication computations, at most, key generation can be done at very high speed, and, even though some entities might be expressed by the linear combination of collaborators, it is still possible to prevent the counterfeiting of secret keys for those entities.

With the present invention, moreover, the random number terms are eliminated only after all blocks have been completely computed, wherefore divided blocks cannot be independently attacked and it is possible to circumvent random number substitution attack.

The above illustrated and described secret key generation method, encryption method, cryptographic communications method, common key generator, cryptographic communications system, and recording media are disclosed in Japanese Patent Application Nos. 11-16257 and 11-59049 filed on Jan. 25, 1999 and Mar. 5, 1999 respectively, the instant application claims priority of these Japanese Applications, and the entire disclosure thereof is herein incorporated by reference.

What is claimed is:

1. A cryptographic communications method for communications of information between entities wherein a plurality of centers are provided, each of which generates secret keys peculiar to the entities using divided pieces of information resulting from division of information specifying each of the entities, the divided information used to generate the secret keys allowing diminished sizes of the secret keys; one entity generates a first common key using a first component contained in at least one secret key generated by at least one of the plurality of centers, the secret key being peculiar to the one entity, encrypts plaintext to ciphertext using the first common key and sends the ciphertext to another entity, the first component corresponding to one or more of the divided pieces of information specifying said another entity; and said another entity generates a second common key identical to the first common key using a second component contained in secret keys peculiar to the another entity sent from said centers, and decrypts said ciphertext to the original plaintext using the second common key, the second component corresponding to one or more of the divided pieces of information specifying the one entity.

2. A cryptographic communications method for communicating information between entities wherein:

secret keys peculiar to said entities are sent from a center to said entities;

one entity encrypts plaintext to ciphertext using a first common key derived from a first secret key peculiar to the one entity sent from said center and sends the ciphertext to another entity;

said another entity decrypts said ciphertext to the original plaintext using a second common key identical to the first common key, the second common key being derived from a second secret key peculiar to said another entity sent from said center, characterized in that;

a plurality of said centers are deployed;

each of said plurality of centers generates secret keys peculiar to said entities by adding random numbers peculiar to said entities to divided pieces of information resulting from division of information specifying each of said entities, the divided information used to generate the secret keys allowing diminished sizes of the secret keys; and each of said entities generates a common key using a component, contained in the secret key peculiar to that selfsame entity, corresponding to one or more of the divided pieces of information obtained from each of said plurality of centers which specify an opposite entity.

3. The cryptographic communications method according to claim 2, wherein computation formulas for generating secret keys at said centers are as follows:

$$\vec{S_{i1}} \equiv g^{\alpha_{j1} H_1[\vec{I_{j1}}]} \pmod{P}$$

$$\vec{S_{i2}} \equiv \alpha_{j2} H_2[\vec{I_{j2}}] \pmod{P-1}$$

$$\vdots$$

$$\vec{S_{iK}} \equiv \alpha_{jK} H_K[\vec{I_{jK}}] \pmod{P-1}$$

where vector $s_{ij}$ is a secret key corresponding to j'th piece of divided information specifying entity i (j=1, 2, ..., K)

[vector $I_{ij}$] is j'th piece of divided information specifying entity i;

P is a prime number;

K is number of divisions in the information specifying entity i;

g is primitive element for GF (P);

$H_j$ is a symmetrical $2^M \times 2^M$ matrix made up of random numbers;

M is size of divisions in the information specifying entity i; and $\alpha_{ij}$ is a personal secret random number for entity i (where $\alpha_{i1} \ldots \alpha_{iK} \equiv 1 \pmod{P-1}$)).

4. The cryptographic communications method according to claim 3, wherein computation formulas for generating common keys at said entities are as follows:

$$K_{im} \equiv \vec{S_{i1}}[\vec{I_{m1}}]^{\vec{S_{i2}}[\vec{I_{m2}}] \cdots \vec{S_{iK}}[\vec{I_{mK}}]}$$

$$\equiv g^{\alpha_{i1} \cdots \alpha_{iK} H_1[\vec{I_{i1}}][\vec{I_{m1}}] \cdots H_K[\vec{I_{iK}}][\vec{I_{mK}}]}$$

$$\equiv g^{H_1[\vec{I_{i1}}][\vec{I_{m1}}] \cdots H_K[\vec{I_{iK}}][\vec{I_{mK}}]} \pmod{P}$$

where

K$_{im}$ is common key generated by one entity i for another entity m; and vector s$_{ij}$ [vector I$_{ij}$] is a component contained in secret key vector s$_{ij}$ of entity i, corresponding to divided piece of information specifying entity m.

5. A cryptographic communications system for reciprocally performing, between a plurality of entities, encrypting processing for encrypting plaintext that is information to be sent into ciphertext and decrypting processing for decrypting ciphertext so sent back into original plaintext; comprising:

a plurality of centers that generate secret keys peculiar to said entities using pieces of information resulting from division of information specifying each of said entities and that sends said secret keys to said entities, the divided information used to generate the secret keys allowing diminished sizes of the secret keys; and a plurality of entities each of which generates a common key employed mutually in said encryption and decryption processing when communicating with another entity, using a component corresponding to a divided specified information to each entity, contained in own secret key sent from the centers, the component further corresponding to one or more pieces of information specifying said another entity.

6. A cryptographic communications method for communications of information between entities wherein a plurality of centers are provided, each of which generates secret keys peculiar to the entities using divided specifying information resulting from division of information specifying each of the entities into a plurality of blocks, the divided information used to generate the secret keys allowing diminished sizes of the secret keys; one entity generates a first common key using a first component contained in secret keys peculiar to the one entity sent from the centers, encrypts plaintext to ciphertext using the first common key and sends the ciphertext to another entity, the first component corresponding to one or more of the divided pieces of information specifying said another entity; and said another entity generates a second common key identical to the first common key using a second component contained in secret keys peculiar to the another entity sent from said centers, and decrypts said ciphertext to the original plaintext using the second common key, the second component corresponding to one or more of the divided pieces of information specifying the one entity; secret keys for first block of divided specifying information have a multi-layer structure; and secret keys for remaining blocks of divided specifying information have a single-layer structure.

7. A secret key generation method for generating secret keys peculiar to entities using divided specifying information resulting from division of information specifying said entities into a plurality of blocks, the divided information used to generate the secret keys allowing diminished sizes of the secret keys, each entity generating a common key by using a component corresponding to the divided specifying information of another entity, wherein:

computation formulas for generating said secret keys are as follows:

$$\vec{S_{i1}} = \alpha_i H_1[\vec{I_{i1}}] + \beta_{i1}\vec{1}$$

$$\vec{S_{i2}} = \alpha_i H_2[\vec{I_{i2}}] + \beta_{i2}\vec{1}$$

$$\vdots$$

-continued $$\vec{S_{ij}} = \alpha_i H_j[\vec{I_{ij}}] + \beta_{ij}\vec{1}$$

$$\vdots$$

$$\vec{S_{iK}} = \alpha_i H_K[\vec{I_{iK}}] + \beta_{iK}\vec{1}$$

$$\vec{g_{i0}} \equiv g^{\alpha_i - T}\vec{1} \pmod{N}$$

$$\vec{g_{i1}} \equiv g^{\alpha_i - T}\vec{S_{i1}} \pmod{N}$$

$$\vec{g_{i2}} \equiv g^{\alpha_i - T}<\vec{S_{i1}}>^2 \pmod{N}$$

$$\vdots$$

$$\vec{g_{it}} \equiv g^{\alpha_i - T}<\vec{S_{i1}}>^t \pmod{N}$$

$$\vdots$$

$$\vec{g_{iT}} \equiv g^{\alpha_i - T}<\vec{S_{i1}}>^T \pmod{N}$$

where vector s$_{ij}$ is a secret key corresponding to j'th divided specifying information for entity i (j=1, 2, . . . , K)

[vector I$_{ij}$] is j'th divided specifying information for entity i;

vector 1 is a vector of dimension K wherein all components are 1;

H$_j$ is a symmetrical $2^{Mj} \times 2^{Mj}$ matrix made up of random numbers;

M$_j$ is size of j'th divided specifying information for entity i;

K is number of block divisions in information specifying entity i;

$\alpha_i$ is a personal secret random number for entity i (where gcd ($\alpha_i$, $\lambda(N)$)=1 and $\lambda(\cdot)$ is Carmichael function);

N is such that N=PQ (where P and Q are prime);

$\beta_{ij}$ is a personal secret random number for entity i (where $\beta_{i1}+\beta_{i2}+ \ldots +\beta_{iK}=\lambda(N)$);

g is maximum generating element with modulo N;

vector g$_{it}$ is a secret key for 1st block of specifying information for entity i (t=0, 1, 2, . . . , T);

T is degree of exponent portion; and if c is a scalar, and A and B are matrixes represented in (i) and (ii) below, then the expressions B=c$^A$ and B=<A>$^c$ represent (iii) and (iv) below, respectively (i) A=(a$_{\mu\nu}$)

(ii) B=(b$_{\mu\nu}$)

(iii) b$_{\mu\nu}$=c$^a_{\mu\nu}$ (iv) b$_{\mu\nu}$=a$_{\mu\nu}^c$.

8. An encryption method wherein:

secret keys peculiar to entities are generated using divided specifying information resulting from division of information specifying each of said entities into a plurality of blocks, the divided information used to generate the secret keys allowing diminished sizes of the secret keys, each entity generating a common key by using a component corresponding to the divided specifying information of another entity;

plaintext is encrypted to ciphertext at one entity using a common key generated using a component contained in the secret key peculiar to the one entity, the component corresponding to divided specifying information for another entity that is a destination of said ciphertext; and computation formulas for generating said secret keys peculiar to said entities are as follows:

$$\vec{S_{i1}} = \alpha_i H_1[\vec{I_{i1}}] + \beta_{i1}\vec{1}$$

$$\vec{S_{i2}} = \alpha_i H_2[\vec{I_{i2}}] + \beta_{i2}\vec{1}$$

$$\vdots$$

$$\vec{S_{ij}} = \alpha_i H_j[\vec{I_{ij}}] + \beta_{ij}\vec{1}$$

$$\vdots$$

$$\vec{S_{iK}} = \alpha_i H_K[\vec{I_{iK}}] + \beta_{iK}\vec{1}$$

$$\vec{g_{i0}} \equiv g^{\alpha_i^{-T}\vec{1}} \pmod{N}$$

$$\vec{g_{i1}} \equiv g^{\alpha_i^{-T}\vec{S_{i1}}} \pmod{N}$$

$$\vec{g_{i2}} \equiv g^{\alpha_i^{-T}<\vec{S_{i1}}>^2} \pmod{N}$$

$$\vdots$$

$$\vec{g_{it}} \equiv g^{\alpha_i^{-T}<\vec{S_{i1}}>^t} \pmod{N}$$

$$\vdots$$

$$\vec{g_{iT}} \equiv g^{\alpha_i^{-T}<\vec{S_{i1}}>^T} \pmod{N}$$

where vector $s_{ij}$ is a secret key corresponding to j'th divided specifying information for entity i (j=1, 2, . . . , K)

[vector $I_{ij}$] is j'th divided specifying information for entity i;

vector 1 is a vector of dimension K wherein all components are 1;

$H_j$ is a symmetrical $2^{M_j} \times 2^{M_j}$ matrix made up of random numbers;

$M_j$ is size of j'th divided specifying information for entity i;

K is number of block divisions in information specifying entity i;

$\alpha_i$ is a personal secret random number for entity i (where $\gcd(\alpha_i, \lambda(N))=1$ and $\lambda(\cdot)$ is Carmichael function);

N is such that N=PQ (where P and Q are prime);

$\beta_{ij}$ is a personal secret random number for entity i (where $\beta_{i1}+\beta_{i2}+ \ldots +\beta_{iK}=\lambda(N)$);

g is maximum generating element with modulo N;

vector $g_{it}$ is a secret key for 1st block of specifying information for entity i (t=0, 1, 2, . . . , T);

T is degree of exponent portion; and if c is a scalar, and A and B are matrixes represented in (i) and (ii) below, the expressions $B=c^A$ and $B=<A>^c$ represent (iii) and (iv) below, respectively (i) $A=(a_{\mu\nu})$ (ii) $B=(b_{\mu\nu})$ (iii) $b_{\mu\nu}=c^{a_{\mu\nu}}$ (iv) $b_{\mu\nu}=a_{\mu\nu}^c$.

9. The encryption method according to claim 8, wherein computation formulas for generating said common keys are as follows:

$$g_{0im} = \vec{g_{i0}}[\vec{I_{m1}}]$$

$$g_{1im} = \vec{g_{i1}}[\vec{I_{m1}}]$$

$$\vdots$$

$$g_{tim} = \vec{g_{it}}[\vec{I_{m1}}]$$

-continued $$\vdots$$

$$g_{Tim} = \vec{g_{iT}}[\vec{I_{m1}}]$$

$$x_{21m} = \vec{s_{i2}}[\vec{I_{m2}}]$$

$$\vdots$$

$$x_{j1m} = \vec{s_{ij}}[\vec{I_{mj}}]$$

$$\vdots$$

$$x_{Kim} = \vec{s_{iK}}[\vec{I_{mK}}]$$

$$K_{im} \equiv \prod_{t=0}^{T} g_{t\,im}^{TC_t y_{im}^{(T-t)}}$$

$$\equiv g^{\alpha_i^{-T} \sum_{t=0}^{T} {_T}C_t x_{1\,im}^t y_{im}^{T-t}}$$

$$\equiv g^{\alpha_i^{-T}(x_{1\,im}+y_{im})^T}$$

$$\equiv g^{\alpha_i^{-T}(x_{1\,im}+\cdots+x_{kim})^T}$$

$$\equiv g^{\alpha_i^{-T}(\alpha_i H_1[\vec{I_{i1}}][\vec{I_{m1}}]+\beta_{i1}+\cdots+\alpha_i H_K[\vec{I_{iK}}][\vec{I_{mK}}]+\beta_{1K})^T}$$

$$\equiv g^{\alpha_i^{-T}(\alpha_i H_1[\vec{I_{i1}}][\vec{I_{m1}}]+\cdots+H_K[\vec{I_{iK}}][\vec{I_{mK}}]+\lambda(N))^T}$$

$$\equiv g^{\alpha_i^{-T}(\alpha_i(H_1[\vec{I_{i1}}][\vec{I_{m1}}]+\cdots+H_K[\vec{I_{iK}}][\vec{I_{mK}}]))^T}$$

$$\equiv g^{(H_1[\vec{I_{i1}}][\vec{I_{m1}}]+\cdots+H_K[\vec{I_{iK}}][\vec{I_{mK}}])} \pmod{N}$$

where $g_{tim}$ (=vector $g_{it}$ [vector $I_{m1}$]) is a component corresponding to vector $I_{m1}$ for entity m, selected from own vector $g_{it}$ for 1st block of information specifying entity i (t=0, 1, 2, . . . , T);

$x_{1im}$=vector $S_{i1}$ [vector $I_{m1}$];

$x_{jim}$ (=vector $s_{ij}$ [vector $I_{mj}$]) is a component corresponding to vector $I_{mj}$ for entity m, selected from own vector $s_{ij}$ for j'th block of information specifying entity i (j=2, 3, . . . , K);

$K_{im}$ is a common key generated by one entity i for another entity m; and $y_{im}$ is sum of (K−1) components $x_{jim}$ (j=2, 3, . . . , K), that is, $y_{im}=x_{2im}+x_{3im}+ \ldots +x_{Kim}$.

10. A cryptographic communications method for communications of information between entities, wherein a plurality of centers are deployed, each of which generates secret keys peculiar to said entities using divided specifying information resulting from division of information specifying each of said entities into a plurality of blocks, the divided information used to generate the secret keys allowing diminished sizes of the secret keys, and sends the secret keys to the entities respectively;

one entity generates a first common key using a first component contained in secret keys peculiar to the one entity sent from the centers, encrypts plaintext to ciphertext using the first common key, and sends the ciphertext to said another entity, the first component corresponding to divided specifying information for another entity;

said another entity generates a second common key identical to the first common key using a second component contained in secret keys peculiar to said another entity sent from the centers, and decrypts said ciphertext using the second common key, the second component corresponding to divided specifying information for the one entity; and computation formulas for generating said secret keys at said centers are as follows:

$$\vec{S_{i1}} = \alpha_i H_1[\vec{I_{i1}}] + \beta_{i1}\vec{1}$$

$$\vec{S_{i2}} = \alpha_i H_2[\vec{I_{i2}}] + \beta_{i2}\vec{1}$$

$$\vdots$$

$$\vec{S_{ij}} = \alpha_i H_j[\vec{I_{ij}}] + \beta_{ij}\vec{1}$$

$$\vdots$$

$$\vec{S_{iK}} = \alpha_i H_K[\vec{I_{iK}}] + \beta_{iK}\vec{1}$$

$$\vec{g_{i0}} \equiv g^{\alpha_i^{-T}\vec{1}} \pmod{N}$$

$$\vec{g_{i1}} \equiv g^{\alpha_i^{-T}\vec{S_{ij}}} \pmod{N}$$

$$\vec{g_{i2}} \equiv g^{\alpha_i^{-T}<\vec{S_{ij}}>^2} \pmod{N}$$

$$\vdots$$

$$\vec{g_{it}} \equiv g^{\alpha_i^{-T}<\vec{S_{ij}}>^t} \pmod{N}$$

$$\vdots$$

$$\vec{g_{iT}} \equiv g^{\alpha_i^{-T}<\vec{S_{ij}}>^T} \pmod{N}$$

where vector $s_{ij}$ is a secret key corresponding to j'th divided specifying information for entity i (j=1, 2, . . . , K)

[vector $I_{ij}$] is j'th divided specifying information for entity i;

vector 1 is a vector of dimension K wherein all components are 1;

$H_j$ is a symmetrical $2^{Mj} \times 2^{Mj}$ matrix made up of random numbers;

$M_j$ is size of j'th divided specifying information for entity i;

K is number of block divisions in information specifying entity i;

$\alpha_i$ is a personal secret random number for entity i (where gcd $(\alpha_i, \lambda(N))=1$ and $\lambda(\cdot)$ is Carmichael function);

N is such that N=PQ (where P and Q are prime);

$\beta_{ij}$ is a personal secret random number for entity i (where $\beta_{i1}+\beta_{i2}+ \ldots +\beta_{iK}=\lambda(N)$);

g is maximum generating element with modulo N;

vector $g_{it}$ is a secret key for 1st block of information specifying entity i (t=0, 1, 2, . . . , T);

T is degree of exponent portion; and if c is a scalar, and A and B are matrixes represented in (i) and (ii) below, the expressions $B=c^A$ and $B=<A>^c$ represent (iii) and (iv) below, respectively (i) $A=(a_{\mu\nu})$ (ii) $B=(b_{\mu\nu})$ (iii) $b_{\mu\nu}=c^{a_{\mu\nu}}$ (iv) $b_{\mu\nu}=a_{\mu\nu}c$.

11. The cryptographic communications method according to claim 10, wherein computation formulas for generating said common keys are as follows:

$$g_{0im} = \vec{g_{i0}}[\vec{I_{m1}}]$$

-continued $$g_{1im} = \vec{g_{i1}}[\vec{I_{m1}}]$$

$$\vdots$$

$$g_{tim} = \vec{g_{it}}[\vec{I_{m1}}]$$

$$\vdots$$

$$g_{Tim} = \vec{g_{iT}}[\vec{I_{m1}}]$$

$$x_{2im} = \vec{s_{i2}}[\vec{I_{m2}}]$$

$$\vdots$$

$$x_{jim} = \vec{s_{ij}}[\vec{I_{mj}}]$$

$$\vdots$$

$$x_{Kim} = \vec{s_{iK}}[\vec{I_{mK}}]$$

$$K_{im} \equiv \prod_{t=0}^{T} g_{tim}^{TC_t y_{jim}^{(T-t)}}$$

$$\equiv g^{\alpha_i^{-T}} \sum_{t=0}^{T} Cx_{1im}^t y_{im}^{T-t}$$

$$\equiv g^{\alpha_i^{-T}(x_{1im}+y_{im})^T}$$

$$\equiv g^{\alpha_i^{-T}(x_{1im}+\cdots+x_{kim})^T}$$

$$\equiv g^{\alpha_i^{-T}(\alpha_i H_1[\vec{I_{j1}}][\vec{I_{m1}}]+\beta_{i1}+\cdots+\alpha_i H_K[\vec{I_{1k}}][\vec{I_{mK}}]+\beta_{iK})^T}$$

$$\equiv g^{\alpha_i^{-T}(\alpha_i H_1[\vec{I_{j1}}][\vec{I_{m1}}]+\cdots+H_K[\vec{I_{1k}}][\vec{I_{mK}}]+\lambda(N))^T}$$

$$\equiv g^{\alpha_i^{-T}(\alpha_i(H_1[\vec{I_{j1}}][\vec{I_{m1}}]+\cdots+H_K[\vec{I_{1k}}][\vec{I_{mK}}]))^T}$$

$$\equiv g^{(H_1[\vec{I_{j1}}][\vec{I_{m1}}]+\cdots+H_K[\vec{I_{1k}}][\vec{I_{mK}}])^T} \pmod{N}$$

where $g_{tim}$(=vector $g_{it}$ [vector $I_{m1}$]) is a component corresponding to vector $I_{m1}$ for entity m, selected from own vector $g_{it}$ for 1st block of information specifying entity i (t=0, 1, 2, . . . , T);

$x_{1im}$=vector $s_{i1}$ [vector $I_{m1}$];

$x_{jim}$ (=vector $s_{ij}$ [vector $I_{mj}$]) is a component corresponding to vector $I_{mj}$ for entity m, selected from own vector $s_{ij}$ for j'th block of information specifying entity i (j=2, 3, . . . , K);

$K_{im}$ is a common key generated by one entity i for another entity m; and $y_{im}$ is sum of (K-1) components $x_{jim}$ (=2, 3, . . . , K), that is, $y_{im}=x_{2im}+x_{3im}+ \ldots +x_{Kim}$.

12. A common key generator provided at entities in a cryptographic communications system for generating a common key to be used in processing to encrypt plaintext to ciphertext and in processing to decrypt ciphertext back to plaintext, comprising:

storage means for storing secret keys peculiar to said entities produced, according to computation formulas given below, for divided specifying information resulting from division of information specifying each of said entities into a plurality of blocks, the divided information used to generate the secret keys allowing diminished sizes of the secret keys, each entity generating a common key by using a component corresponding to the divided specifying information of another entity;

selection means for selecting components corresponding to divided specifying information for opposite entities to be communicated with, from the secret keys stored; and means for generating said common keys, according to computation formulas given below, using said components so selected:

$$\vec{S_{i1}} = \alpha_i H_1[\vec{I_{i1}}] + \beta_{i1}\vec{1}$$

$$\vec{S_{i2}} = \alpha_i H_2[\vec{I_{i2}}] + \beta_{i2}\vec{1}$$

$$\vdots$$

$$\vec{S_{ij}} = \alpha_i H_j[\vec{I_{ij}}] + \beta_{ij}\vec{1}$$

$$\vdots$$

$$\vec{S_{iK}} = \alpha_i H_K[\vec{I_{iK}}] + \beta_{iK}\vec{1}$$

$$\vec{g_{i0}} \equiv g^{\alpha_i^{-T}\vec{1}} \pmod{N}$$

$$\vec{g_{i1}} \equiv g^{\alpha_i^{-T}\vec{S_{i1}}} \pmod{N}$$

$$\vec{g_{i2}} \equiv g^{\alpha_i^{-T}<\vec{S_{i1}}>^2} \pmod{N}$$

$$\vdots$$

$$\vec{g_{it}} \equiv g^{\alpha_i^{-T}<\vec{S_{i1}}>^t} \pmod{N}$$

$$\vdots$$

$$\vec{g_{iT}} \equiv g^{\alpha_i^{-T}<\vec{S_{i1}}>^T} \pmod{N}$$

where
vector $s_{ij}$ is a secret key corresponding to j'th divided specifying information for entity i (j=1, 2, . . . , K)

[vector $I_{ij}$] is j'th divided specifying information for entity i;

vector 1 is a vector of dimension K wherein all components are 1;

$H_j$ is a symmetrical $2^{Mj} \times 2^{Mj}$ matrix made up of random numbers;

$M_j$ is size of j'th divided specifying information for entity i;

K is number of block divisions in information specifying entity i;

$\alpha_i$ is a personal secret random number for entity i (where gcd $(\alpha_i, \lambda(N))=1$ and $\lambda(\cdot)$ is Carmichael function);

N is such that N=PQ (where P and Q are prime);

$\beta_{ij}$ is a personal secret random number for entity i (where $\beta_{i1}+\beta_{i2}+ \ldots +\beta_{iK}=\lambda(N)$);

g is maximum generating element with modulo N;

vector $g_{it}$ is a secret key for 1st block of information specifying entity i (t=0, 1, 2 . . . , T);

T is degree of exponent portion; and if c is a scalar, and A and B are matrixes represented in (i) and (ii) below, the expressions $B=c^A$ and $B=<A>^c$ represent (iii) and (iv) below, respectively
(i) $A=(a_{\mu\nu})$
(ii) $B=(b_{\mu\nu})$
(iii) $b_{\mu\nu}=c^a{}_{\mu\nu}$
(iv) $b_{\mu\nu}=a_{\mu\nu}{}^c$ $$g_{0im} = \vec{g_{i0}}[\vec{I_{m1}}]$$

$$g_{1im} = \vec{g_{i1}}[\vec{I_{m1}}]$$

-continued $$g_{tim} = \vec{g_{it}}[\vec{I_{m1}}]$$

$$\vdots$$

$$g_{Tim} = \vec{g_{iT}}[\vec{I_{m1}}]$$

$$x_{2im} = \vec{s_{i2}}[\vec{I_{m2}}]$$

$$\vdots$$

$$x_{jim} = \vec{s_{ij}}[\vec{I_{mj}}]$$

$$\vdots$$

$$x_{Kim} = \vec{s_{iK}}[\vec{I_{mK}}]$$

$$K_{im} \equiv \prod_{t=0}^{T} g_{tim}^{T C_t y_{jm}^{(T-t)}}$$

$$\equiv g^{\alpha_i^{-T}} \sum_{t=0}^{T} C x_{1im}^t y_{im}^{T-t}$$

$$\equiv g^{\alpha_i^{-T}(x_{1im}+y_{im})^T}$$

$$\equiv g^{\alpha_i^{-T}(x_{1im}+\cdots+x_{kim})^T}$$

$$\equiv g^{\alpha_i^{-T}(\alpha_i H_1[\vec{I_{j1}}][\vec{I_{m1}}]+\beta_{i1}+\cdots+\alpha_i H_K[\vec{I_{1k}}][\vec{I_{mK}}]+\beta_{iK})^T}$$

$$\equiv g^{\alpha_i^{-T}(\alpha_i H_1[\vec{I_{j1}}][\vec{I_{m1}}]+\cdots+H_K[\vec{I_{1k}}][\vec{I_{mK}}]+\lambda(N))^T}$$

$$\equiv g^{\alpha_i^{-T}(\alpha_i(H_1[\vec{I_{i1}}][\vec{I_{m1}}]+\cdots+H_K[\vec{I_{1k}}][\vec{I_{mK}}]))^T}$$

$$\equiv g^{(H_1[\vec{I_{j1}}][\vec{I_{m1}}]+\cdots+H_K[\vec{I_{1k}}][\vec{I_{mK}}])^T} \pmod{N}$$

where $g_{tim}$ (=vector $g_{it}$ [vector $I_{m1}$]) is a component corresponding to vector $I_{m1}$ for entity m, selected from own vector $g_{it}$ for 1st block of information specifying entity i (t=0, 1, 2, . . . , T);

$x_{1im}$=vector $s_{i1}$ [vector $I_{m1}$];

$x_{jim}$ (=vector $s_{ij}$ [vector $I_{mj}$]) is a component corresponding to vector $I_{mj}$ for entity m, selected from own vector $s_{ij}$ for j'th block of information specifying entity i (j=2, 3, . . . , K);

$K_{im}$ is a common key generated by one entity i for another entity m; and $y_{im}$ is sum of (K-1) components $x_{jim}$ (j=2, 3, . . . , K), that is, $y_{im}=x_{2im}+x_{3im}+ \ldots +x_{Kim}$.

13. A cryptographic communications system for reciprocally performing, between a plurality of entities, encryption processing for encrypting plaintext that is information to be sent into ciphertext and decryption processing for decrypting ciphertext so sent back into original plaintext, comprising:

a plurality of centers each of which generates secret keys peculiar to said entities, according to computation formulas given below, using divided specifying information resulting from division of information specifying each of said entities into a plurality of blocks, the divided information used to generate the secret keys allowing diminished sizes of the secret keys, and sends said secret keys to said entities; and a plurality of entities each of which generates a common key mutually employed in said encryption and decryption processing when communicating with another entity, according to computation formulas given below, using a component contained in own secret key sent from said centers, the component corresponding to divided specifying information for said another entity:

$$\vec{S_{i1}} = \alpha_i H_1[\vec{I_{i1}}] + \beta_{i1}\vec{1}$$

$$\vec{S_{i2}} = \alpha_i H_2[\vec{I_{i2}}] + \beta_{i2}\vec{1}$$

$$\vdots$$

$$\vec{S_{ij}} = \alpha_i H_j[\vec{I_{ij}}] + \beta_{ij}\vec{1}$$

$$\vdots$$

$$\vec{S_{iK}} = \alpha_i H_K[\vec{I_{iK}}] + \beta_{iK}\vec{1}$$

$$\vec{g_{i0}} \equiv g^{\alpha_i^{-T}\vec{1}} \pmod{N}$$

$$\vec{g_{i1}} \equiv g^{\alpha_i^{-T}\vec{S_{i1}}} \pmod{N}$$

$$\vec{g_{i2}} \equiv g^{\alpha_i^{-T}<\vec{S_{i1}}>^2} \pmod{N}$$

$$\vdots$$

$$\vec{g_{it}} \equiv g^{\alpha_i^{-T}<\vec{S_{i1}}>^t} \pmod{N}$$

$$\vdots$$

$$\vec{g_{iT}} \equiv g^{\alpha_i^{-T}<\vec{S_{i1}}>^T} \pmod{N}$$

where
vector $s_{ij}$ is a secret key corresponding to j'th divided specifying information for entity i (j=1, 2, ..., K)
[vector $I_{ij}$] is j'th divided specifying information for entity i;
vector 1 is a vector of dimension K wherein all components are 1;
$H_j$ is a symmetrical $2^{Mj} \times 2^{Mj}$ matrix made up of random numbers;
$M_j$ is size of j'th divided specifying information for entity i;
K is number of block divisions in information specifying entity i;
$\alpha_i$ is a personal secret random number for entity i (where gcd $(\alpha_i, \lambda(N))=1$ and $\lambda(\cdot)$ is Carmichael function);
N is such that N=PQ (where P and Q are prime);
$\beta_{ij}$ is a personal secret random number for entity i (where $\beta_{i1}+\beta_{i2}+\ldots+\beta_{iK}=\lambda(N)$);
g is maximum generating element with modulo N;
vector $g_{it}$ is a secret key for 1st block of information specifying entity i (t=0, 1, 2, ..., T);
T is degree of exponent portion; and
if c is a scalar, and A and B are matrixes represented in (i) and (ii) below, the expressions $B=c^A$ and $B=<A>^c$ represent (iii) and (iv) below, respectively
(i) $A=(a_{\mu\nu})$
(ii) $B=(b_{\mu\nu})$
(iii) $b_{\mu\nu}=c^{a_{\mu\nu}}$
(iv) $b_{\mu\nu}=a_{\mu\nu}^c$ $$g_{0im} = \vec{g_{i0}}[\vec{I_{m1}}]$$

$$g_{1im} = \vec{g_{i1}}[\vec{I_{m1}}]$$

$$\vdots$$

$$g_{tim} = \vec{g_{it}}[\vec{I_{m1}}]$$

$$\vdots$$

-continued $$g_{Tim} = \vec{g_{iT}}[\vec{I_{m1}}]$$

$$x_{2im} = \vec{s_{i2}}[\vec{I_{m2}}]$$

$$\vdots$$

$$x_{jim} = \vec{s_{ij}}[\vec{I_{mj}}]$$

$$\vdots$$

$$x_{Kim} = \vec{s_{iK}}[\vec{I_{mK}}]$$

$$K_{im} \equiv \prod_{t=0}^{T} g_{tim}^{T C_t y_{jm}^{(T-t)}}$$

$$\equiv g^{\alpha_i^{-T} \sum_{t=0}^{T} {}_T C_t x_{1im}^t y_{im}^{T-t}}$$

$$\equiv g^{\alpha_i^{-T}(x_{1im}+y_{im})^T}$$

$$\equiv g^{\alpha_i^{-T}(x_{1im}+\cdots+x_{kim})^T}$$

$$\equiv g^{\alpha_i^{-T}(\alpha_i H_1[\vec{I_{j1}}][\vec{I_{m1}}]+\beta_{i1}+\cdots+\alpha_i H_K[\vec{I_{1k}}][\vec{I_{mK}}]+\beta_{iK})^T}$$

$$\equiv g^{\alpha_i^{-T}(\alpha_i H_1[\vec{I_{j1}}][\vec{I_{m1}}]+\cdots+H_K[\vec{I_{1k}}][\vec{I_{mK}}]+\lambda(N))^T}$$

$$\equiv g^{\alpha_i^{-T}(\alpha_i(H_1[\vec{I_{j1}}][\vec{I_{m1}}]+\cdots+H_K[\vec{I_{1k}}][\vec{I_{mK}}]))^T}$$

$$\equiv g^{(H_1[\vec{I_{j1}}][\vec{I_{m1}}]+\cdots+H_K[\vec{I_{1k}}][\vec{I_{mK}}])^T} \pmod{N}$$

where
$g_{tim}$ (=vector $g_{it}$ [vector $I_{m1}$]) is a component corresponding to vector $I_{m1}$ for entity m, selected from own vector $g_{it}$ for 1st block of information specifying entity i (t=0, 1, 2, ..., T);
$x_{1im}$=vector $s_{i1}$ [vector $I_{m1}$];
$x_{jim}$ (=vector $s_{ij}$ [vector $I_{mj}$]) is a component corresponding to vector $I_{mj}$ for entity m, selected from own vector $s_{ij}$ for j'th block of information specifying entity i (j=2, 3, ..., K);
$K_{im}$ is a common key generated by one entity i for another entity m; and
$y_{im}$ is sum of (K-1) components $x_{jim}$ (j=2, 3, ..., K), that is, $y_{im}=x_{2im}+x_{3im}+\ldots+x_{Kim}$.

14. A computer readable recording medium embodied in a tangible physical object for storing a program that generates at entities involved in communications a common key mutually used in processing to encrypt plaintext to ciphertext and in processing to decrypt said ciphertext back to said plaintext in a cryptographic communications system, comprising:

first program code means for causing said computer to select a component corresponding to divided specifying information of one entity that is a ciphertext recipient from a secret key peculiar to another entity that is a ciphertext sender, according to computation formulas given below, for each of divided specifying information resulting from division of information specifying each of said entities into a plurality of blocks, the divided information allowing a diminished size of the secret key; and second program code means for causing said computer to generate said common key, according to computation formulas given below, using said components selected:

$$\vec{S_{i1}} = \alpha_i H_1[\vec{I_{i1}}] + \beta_{i1}\vec{1}$$

$$\vec{S_{i2}} = \alpha_i H_2[\vec{I_{i2}}] + \beta_{i2}\vec{1}$$

$$\vdots$$

$$\vec{S_{ij}} = \alpha_i H_j[\vec{I_{ij}}] + \beta_{ij}\vec{1}$$

$$\vdots$$

$$\vec{S_{iK}} = \alpha_i H_K[\vec{I_{iK}}] + \beta_{iK}\vec{1}$$

$$\vec{g_{i0}} \equiv g^{\alpha_i^{-T}\vec{1}} \pmod{N}$$

$$\vec{g_{i1}} \equiv g^{\alpha_i^{-T}\vec{S_{i1}}} \pmod{N}$$

$$\vec{g_{i2}} \equiv g^{\alpha_i^{-T}<\vec{S_{i1}}>^2} \pmod{N}$$

$$\vdots$$

$$\vec{g_{it}} \equiv g^{\alpha_i^{-T}<\vec{S_{i1}}>^t} \pmod{N}$$

$$\vdots$$

$$\vec{g_{iT}} \equiv g^{\alpha_i^{-T}<\vec{S_{i1}}>^T} \pmod{N}$$

where vector $s_{ij}$ is a secret key corresponding to j'th divided specifying information for entity i (j=1, 2, ..., K)

[vector $I_{ij}$] is j'th divided specifying information for entity i;

vector 1 is a vector of dimension K wherein all components are 1;

$H_j$ is a symmetrical $2^{Mj} \times 2^{Mj}$ matrix made up of random numbers;

$M_j$ is size of j'th divided specifying information for entity i;

K is number of block divisions in information specifying entity i;

$\alpha_i$ is a personal secret random number for entity i (where gcd $(\alpha_i, \lambda(N))=1$ and $\lambda(\cdot)$ is Carmichael function);

N is such that N=PQ (where P and Q are prime);

$\beta_{ij}$ is a personal secret random number for entity i (where $\beta_{i1}+\beta_{i2}+ \ldots +\beta_{iK}=\lambda(N)$);

g is maximum generating element with modulo N;

vector $g_{it}$ is a secret key for 1st block of information specifying entity i (t=0, 1, 2, ..., T);

T is degree of exponent portion; and if c is a scalar, and A and B are matrixes represented in (i) and (ii) below, the expressions $B=c^A$ and $B=<A>^c$ represent (iii) and (iv) below, respectively (i) $A=(a_{\mu\nu})$
(ii) $B=(b_{\mu\nu})$
(iii) $b_{\mu\nu}=c^a{}_{\mu\nu}$
(iv) $b_{\mu\nu}=a_{\mu\nu}{}^c$ $$g_{0im} = \vec{g_{i0}}[\vec{I_{m1}}]$$

$$g_{1im} = \vec{g_{i1}}[\vec{I_{m1}}]$$

$$\vdots$$

$$g_{tim} = \vec{g_{it}}[\vec{I_{m1}}]$$

$$\vdots$$

$$g_{Tim} = \vec{g_{iT}}[\vec{I_{m1}}]$$

-continued $$x_{2im} = \vec{s_{i2}}[\vec{I_{m2}}]$$

$$\vdots$$

$$x_{jim} = \vec{s_{ij}}[\vec{I_{mj}}]$$

$$\vdots$$

$$x_{Kim} = \vec{s_{iK}}[\vec{I_{mK}}]$$

$$K_{im} \equiv \prod_{t=0}^{T} g_{tim}^{T C_t y_{jm}^{(T-t)}}$$

$$\equiv g^{\alpha_i^{-T}} \sum_{t=0}^{T} C x_{1im}^t y_{im}^{T-t}$$

$$\equiv g^{\alpha_i^{-T}(x_{1im}+y_{im})^T}$$

$$\equiv g^{\alpha_i^{-T}(x_{1im}+\cdots+x_{kim})^T}$$

$$\equiv g^{\alpha_i^{-T}(\alpha_i H_1[\vec{I_{j1}}][\vec{I_{m1}}]+\beta_{i1}+\cdots+\alpha_i H_K[\vec{I_{1k}}][\vec{I_{mK}}]+\beta_{iK})^T}$$

$$\equiv g^{\alpha_i^{-T}(\alpha_i H_1[\vec{I_{j1}}][\vec{I_{m1}}]+\cdots+H_K[\vec{I_{1k}}][\vec{I_{mK}}]+\lambda(N))^T}$$

$$\equiv g^{\alpha_i^{-T}(\alpha_i(H_1[\vec{I_{j1}}][\vec{I_{m1}}]+\cdots+H_K[\vec{I_{1k}}][\vec{I_{mK}}]))^T}$$

$$\equiv g^{(H_1[\vec{I_{j1}}][\vec{I_{m1}}]+\cdots+H_K[\vec{I_{1k}}][\vec{I_{mK}}])^T} \pmod{N}$$

where $g_{tim}$ (=vector $g_{it}$ [vector $I_{m1}$]) is a component corresponding to vector $I_{m1}$ for entity m, selected from own vector $g_{it}$ for 1st block of information specifying entity i (t=0, 1, 2, ..., T);

$x_{1im}$=vector $s_{i1}$[vector $I_{m1}$];

$x_{jim}$ (=vector $s_{ij}$ [vector $I_{mj}$]) is a component corresponding to vector $I_{mj}$ for entity m, selected from own vector $s_{ij}$ for j'th block of information specifying entity i (j=2, 3, ..., K);

$K_{im}$ is a common key generated by one entity i for another entity m; and $y_{im}$ is sum of (K-1) components $x_{jim}$ (j=2, 3, ..., K), that is, $y_{im}=x_{2im}+x_{3im}+ \ldots +x_{Kim}$.

15. A computer readable program embodied in a tangible physical object for generating at entities involved in communications a common key mutually used in processing to encrypt plaintext to ciphertext and in processing to decrypt said ciphertext back to said plaintext in a cryptographic communications system, comprising:

first code segment for causing a computer to select a component corresponding to divided specifying information of one entity that is a ciphertext recipient from a secret key peculiar to another entity that is a ciphertext sender, according to computation formulas given below, for each of divided specifying information resulting from division of information specifying each of said entities into a plurality of blocks, the divided information allowing a diminished size of the secret key; and second code segment for causing said computer to generate said common key, according to computation formulas given below, wherein said computer generates said common keys by using a component corresponding to the divided specifying information of another computer, using said components selected:

$$\vec{S_{i1}} = \alpha_i H_1[\vec{I_{i1}}] + \beta_{i1}\vec{1}$$

$$\vec{S_{i2}} = \alpha_i H_2[\vec{I_{i2}}] + \beta_{i2}\vec{1}$$

$$\vdots$$

$$\vec{S_{ij}} = \alpha_i H_j[\vec{I_{ij}}] + \beta_{ij}\vec{1}$$

$$\vdots$$

$$\vec{S_{iK}} = \alpha_i H_K[\vec{I_{iK}}] + \beta_{iK}\vec{1}$$

$$\vec{g_{i0}} \equiv g^{\alpha_i^{-T}\vec{1}} \pmod{N}$$

$$\vec{g_{i1}} \equiv g^{\alpha_i^{-T}\vec{S_{i1}}} \pmod{N}$$

$$\vec{g_{i2}} \equiv g^{\alpha_i^{-T}<\vec{S_{i1}}>^2} \pmod{N}$$

$$\vdots$$

$$\vec{g_{1t}} \equiv g^{\alpha_i^{-T}<\vec{S_{i1}}>^t} \pmod{N}$$

$$\vdots$$

$$\vec{g_{1T}} \equiv g^{\alpha_i^{-T}<\vec{S_{i1}}>^T} \pmod{N}$$

where vector $s_{ij}$ is a secret key corresponding to j'th divided specifying information for entity i (j=1, 2, . . . , K)

[vector $I_{ij}$] is j'th divided specifying information for entity i;

vector 1 is a vector of dimension K wherein all components are 1;

$H_j$ is a symmetrical $2^{Mj} \times 2^{Mj}$ matrix made up of random numbers;

$M_j$ is size of j'th divided specifying information for entity i;

K is number of block divisions in information specifying entity i;

$\alpha_i$ is a personal secret random number for entity i (where gcd $(\alpha_i, \lambda(N))=1$ and $\lambda(\cdot)$ is Carmichael function);

N is such that N=PQ (where P and Q are prime);

$\beta_{ij}$ is a personal secret random number for entity i (where $\beta_{i1}+\beta_{i2}+ \ldots +\beta_{iK}=\lambda(N)$);

g is maximum generating element with modulo N;

vector $g_{it}$ is a secret key for 1st block of information specifying entity i (t=0, 1, 2, . . . , T);

T is degree of exponent portion; and if c is a scalar, and A and B are matrixes represented in (i) and (ii) below, the expressions $B=c^A$ and $B=<A>^c$ represent (iii) and (iv) below, respectively (i) $A=(a_{\mu v})$ (ii) $B=(b_{\mu v})$ (iii) $b_{\mu v}=c^{a_{\mu v}}$ (iv) $b_{\mu v}=a_{\mu v}^c$ $$g_{0im} = \vec{g_{i0}}[\vec{I_{m1}}]$$

$$g_{1im} = \vec{g_{i1}}[\vec{I_{m1}}]$$

$$\vdots$$

$$g_{tim} = \vec{g_{it}}[\vec{I_{m1}}]$$

$$\vdots$$

$$g_{Tim} = \vec{g_{iT}}[\vec{I_{m1}}]$$

$$x_{2im} = \vec{s_{i2}}[\vec{I_{m2}}]$$

$$\vdots$$

$$x_{jim} = \vec{s_{ij}}[\vec{I_{mj}}]$$

$$\vdots$$

$$x_{Kim} = \vec{s_{iK}}[\vec{I_{mK}}]$$

$$K_{im} \equiv \prod_{t=0}^{T} g_{tim}^{TC_t y_{jm}^{(T-t)}}$$

$$\equiv g^{\alpha_i^{-T} \sum_{t=0}^{T} {}_T C x_{1im}^t y_{im}^{T-t}}$$

$$\equiv g^{\alpha_i^{-T}(x_{1im}+y_{im})^T}$$

$$\equiv g^{\alpha_i^{-T}(x_{1im}+\cdots+x_{kim})^T}$$

$$\equiv g^{\alpha_i^{-T}(\alpha_i H_1[\vec{I_{j1}}][\vec{I_{m1}}]+\beta_{i1}+\cdots+\alpha_i H_K[\vec{I_{1k}}][\vec{I_{mK}}]+\beta_{iK})^T}$$

$$\equiv g^{\alpha_i^{-T}(\alpha_i H_1[\vec{I_{j1}}][\vec{I_{m1}}]+\cdots+H_K[\vec{I_{1k}}][\vec{I_{mK}}]+\lambda(N))^T}$$

$$\equiv g^{\alpha_i^{-T}(\alpha_i(H_1[\vec{I_{ij}}][\vec{I_{m1}}]+\cdots+H_K[\vec{I_{1k}}][\vec{I_{mK}}]))^T}$$

$$\equiv g^{(H_1[\vec{I_{j1}}][\vec{I_{m1}}]+\cdots+H_K[\vec{I_{1k}}][\vec{I_{mK}}])^T} \pmod{N}$$

where $g_{tim}$ (=vector $g_{it}$ [vector $I_{m1}$]) is a component corresponding to vector $I_{m1}$ for entity m, selected from own vector $g_{it}$ for 1st block of information specifying entity i (t=0, 1, 2, . . . , T);

$x_{lim}$=vector $s_{il}$ [vector $I_{ml}$];

$x_{jim}$ (=vector $s_{ij}$ [vector $I_{mj}$]) is a component corresponding to vector $I_{mj}$ for entity m, selected from own vector $s_{ij}$ for j'th block of information specifying entity i (j=2, 3, . . . , K);

$K_{im}$ is a common key generated by one entity i for another entity m; and $y_{im}$ is sum of (K-1) components $x_{jim}$ (j=2, 3, . . . , K), that is, $y_{im}=x_{2im}+x_{3im}++\ldots x_{Kim}$.

* * * * *

UNITED STATES PATENT AND TRADEMARK OFFICE
CERTIFICATE OF CORRECTION

| | | |
|---|---|---|
| PATENT NO. | : 7,065,210 B1 | Page 1 of 1 |
| APPLICATION NO. | : 09/489696 | |
| DATED | : June 20, 2006 | |
| INVENTOR(S) | : Shigeo Tsujii et al. | |

It is certified that error appears in the above-identified patent and that said Letters Patent is hereby corrected as shown below:

Title Page, Item (75) Inventors: after "Shigeo Tsujii, Shibuya-ku (JP)" and before "Masao Kasahara, Minoo (JP)" insert --Yasuyuki Murakami, Uji-shi (JP)--.

Signed and Sealed this

Fourteenth Day of August, 2007

JON W. DUDAS
*Director of the United States Patent and Trademark Office*